(12) United States Patent
Gil Vera

(10) Patent No.: US 11,867,143 B2
(45) Date of Patent: Jan. 9, 2024

(54) SYSTEMS, METHODS, AND APPARATUSES FOR IMPLEMENTING A VEHICLE SAFETY LOCK ASSEMBLY

(71) Applicant: Guadalupe Ramon Gil Vera, Portland, OR (US)

(72) Inventor: Guadalupe Ramon Gil Vera, Portland, OR (US)

( * ) Notice: Subject to any disclaimer, the term of this patent is extended or adjusted under 35 U.S.C. 154(b) by 92 days.

(21) Appl. No.: 17/224,950

(22) Filed: Apr. 7, 2021

(65) Prior Publication Data

US 2021/0222660 A1 Jul. 22, 2021

Related U.S. Application Data

(63) Continuation-in-part of application No. 15/983,716, filed on May 18, 2018, now abandoned.

(51) Int. Cl.
*F02N 11/08* (2006.01)
*F02N 11/10* (2006.01)
(Continued)

(52) U.S. Cl.
CPC ........ *F02N 11/0807* (2013.01); *B60R 25/045* (2013.01); *B60R 25/102* (2013.01);
(Continued)

(58) Field of Classification Search
CPC ........... B60R 25/102; B60R 2011/0075; B60R 25/045; B60R 25/209; B60R 25/243;
(Continued)

(56) References Cited

U.S. PATENT DOCUMENTS

D655,702 S    3/2012  Saxton
8,818,725 B2 *  8/2014  Ricci ..................... B60W 40/09
                                                       701/519
(Continued)

OTHER PUBLICATIONS

Final Office Action for U.S. Appl. No. 15/983,716 dated Dec. 3, 2021, 9 pages.
(Continued)

*Primary Examiner* — Paul N Dickson
*Assistant Examiner* — Timothy Wilhelm
(74) *Attorney, Agent, or Firm* — Elliott, Ostrander & Preston, P.C.

(57) ABSTRACT

Systems, methods, and apparatuses for implementing a vehicle safety lock assembly are described herein. For example, according to one embodiment there is a vehicle safety lock assembly system including a sensor of a docking unit to sense a nearby mobile device, in which the docking unit is coupled with a vehicle having an electronic control unit, an ignition system, and a first relay, in which the first relay is to signal from the electronic control unit to the ignition system to start the vehicle's ignition; the docking unit to request a first inhibitory signal from a cloud service and to forward the first inhibitory signal to the electronic control unit to inhibit the first relay; a transmitter to send a docking signal to the cloud service indicating that the mobile device has been docked at the docking unit; a receiver to receive a registration confirmation signal indicating that the mobile device is registered with the cloud service; the docking unit to send a second inhibitory signal, responsive to receiving the registration confirmation signal to restrict functionality of pre-selected features on the mobile device when the mobile device is docked; the docking unit to send an authentication request to the cloud service requesting authentication for the mobile device; the docking unit to receive authentication from the cloud service and to forward
(Continued)

the authentication to the electronic control unit, in which the electronic control unit is to authenticate the mobile device based on the authentication; and the docking unit to transmit a releasing signal through the electronic control unit upon authentication to start the vehicle's ignition. Other related embodiments are disclosed.

20 Claims, 15 Drawing Sheets

(51) Int. Cl.
*B60R 25/045* (2013.01)
*B60R 25/20* (2013.01)
*B60R 25/24* (2013.01)
*B60R 25/102* (2013.01)

(52) U.S. Cl.
CPC .......... *B60R 25/209* (2013.01); *B60R 25/243* (2013.01); *B60R 25/245* (2013.01); *F02N 11/087* (2013.01); *F02N 11/101* (2013.01); *B60R 2325/205* (2013.01)

(58) Field of Classification Search
CPC ............. B60R 25/245; B60R 2325/205; F02N 11/0807; F02N 11/087; F02N 11/101
See application file for complete search history.

(56) References Cited

U.S. PATENT DOCUMENTS

| | | | | |
|---|---|---|---|---|
| 9,079,494 | B2* | 7/2015 | Skelton | B60K 28/063 |
| 9,272,713 | B1* | 3/2016 | Dvoskin | B60K 28/02 |
| 9,278,696 | B2* | 3/2016 | Yi | B60K 28/063 |
| 9,324,234 | B2* | 4/2016 | Ricci | G07C 5/0808 |
| 9,457,754 | B1* | 10/2016 | Christensen | G08G 1/205 |
| 9,519,610 | B2 | 12/2016 | Frye et al. | |
| 9,688,143 | B2* | 6/2017 | Bryk | B60K 31/16 |
| 9,783,123 | B2 | 10/2017 | Hélot et al. | |
| 9,786,154 | B1* | 10/2017 | Potter | G08B 25/00 |
| 9,809,169 | B1* | 11/2017 | Naboulsi | B60R 1/025 |
| 9,986,404 | B2* | 5/2018 | Mehta | H04W 4/02 |
| 11,351,960 | B2* | 6/2022 | Giraud | B62J 50/225 |
| 2010/0279626 | A1* | 11/2010 | Bradley | H04M 1/72463 455/69 |
| 2011/0070930 | A1* | 3/2011 | Pothul | H04M 1/667 455/575.9 |
| 2012/0214408 | A1* | 8/2012 | Chronister | B60R 25/24 455/26.1 |
| 2013/0151111 | A1* | 6/2013 | Skelton | B60R 25/00 701/99 |
| 2017/0104865 | A1* | 4/2017 | Skelton | H04L 63/0876 |
| 2019/0351764 | A1* | 11/2019 | Gil Vera | B60R 11/0241 |

OTHER PUBLICATIONS

Non-Final Office Action for U.S. Appl. No. 15/983,716 dated Nov. 18, 2019, 8 pages.

* cited by examiner

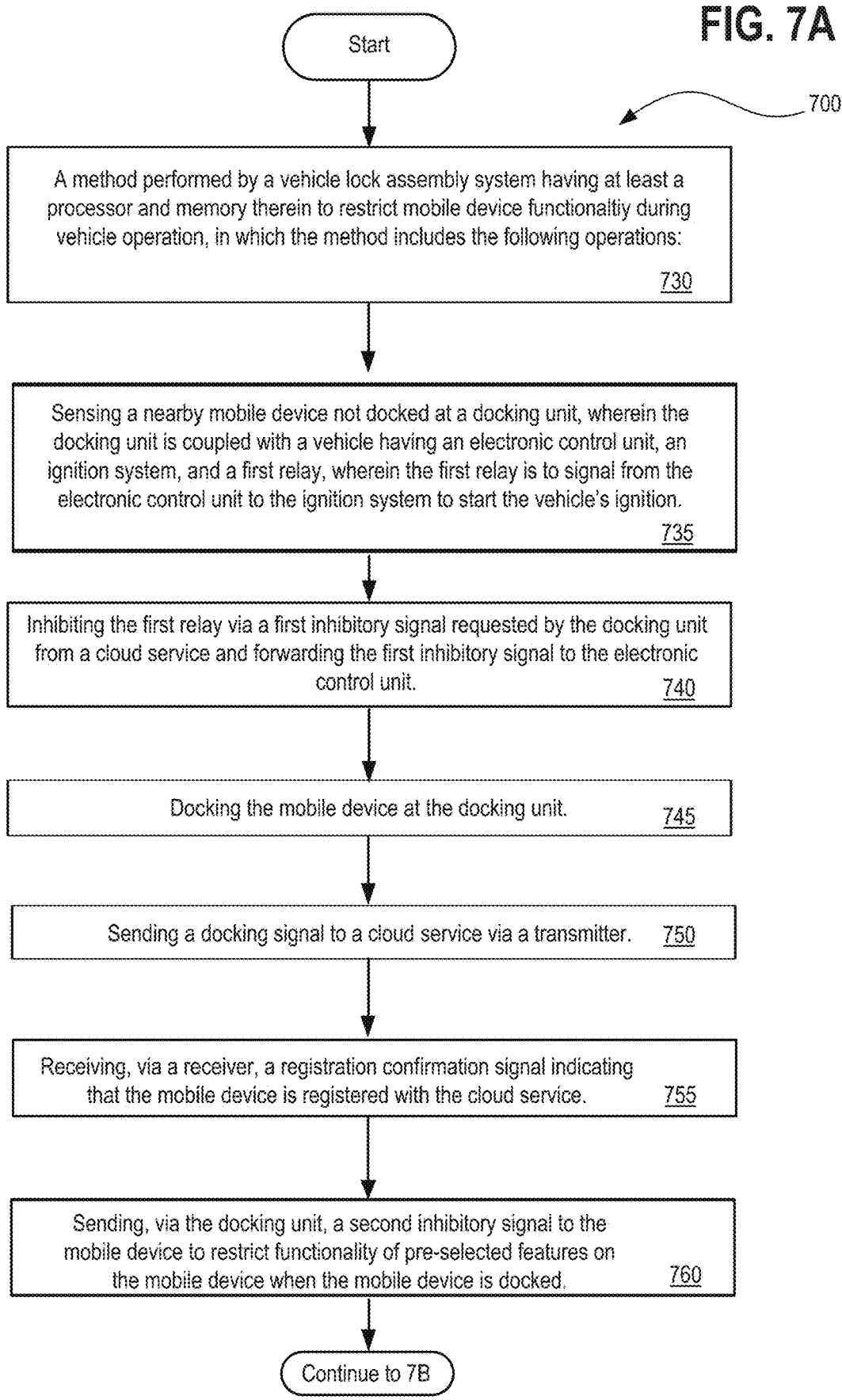

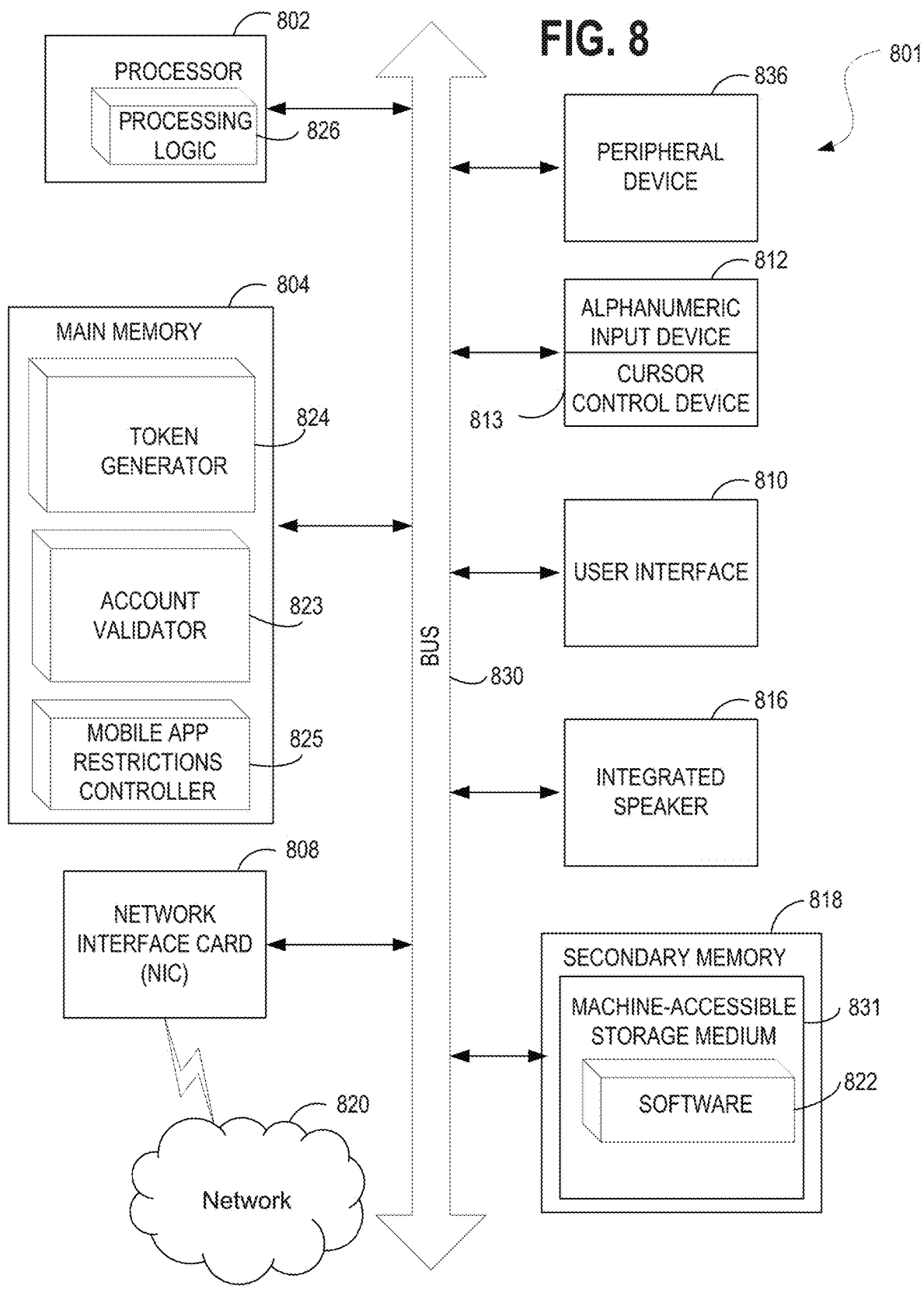

SYSTEMS, METHODS, AND APPARATUSES FOR IMPLEMENTING A VEHICLE SAFETY LOCK ASSEMBLY

CLAIM OF PRIORITY

This U.S. Utility Continuation-In-Part (CIP) Patent Application is related to, and claims priority to, the non-provisional U.S. Utility Patent Application entitled "VEHICLE SAFETY LOCK ASSEMBLY," filed on May 18, 2018, having an application number of Ser. No. 15/983,716, the entire contents of which are incorporated herein by reference as though set forth in full.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of vehicle safety devices and vehicle ignition control devices. More particularly, disclosed embodiments relate to systems, methods, and apparatuses for implementing and utilizing a vehicle safety lock assembly.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

Worldwide, motor vehicle accidents are a major cause of death and injury. The World Health Organization estimates that 1.35 million people die each year as a result of road traffic crashes, costing most countries 3% of their gross domestic product. In fact, road traffic injuries are the leading cause of death for children and young adults aged 5-29 years old. In the United States, the National Safety Council reports that cell phone use while driving (e.g., "distracted driving") leads to an estimated 1.6 million crashes per year. More particularly, so called "texting while driving" is estimated to be the cause of approximately 390,000 injuries per year, with one out of every four automobile accidents in the United States being attributable to the underlying issue of texting while driving.

While there is a well-known push to eradicate the problem of drunk-driving, it may be surprising to many that texting while driving is understood to be six more times likely to cause an accident than drunk driving. Teen drivers are especially at risk, with teen drivers four times more likely than adult drivers to experience car crashes or near-crashes when talking or texting on a cell phone.

Problematically, despite many states having banned texting and the use of hand-held phones while driving, motor vehicle accidents as a result of cell phone usage while driving remains a major problem in the United States. Smart phones and other mobile Internet connected technologies have become a constant companion for individuals who are frequently checking their smart phones or other mobile devices throughout their daily routines no matter where they are or what they are doing, often becoming an unconscious habit, thus further exacerbating the problem. Further still, many drivers simply lack the desire, self-control, or self-restraint to fully comply with applicable laws as well as lack the willingness to activate or utilize existing applications or phone configuration settings which operate to disable or filter phone calls, texting, or media streaming while driving, such as the use of airplane mode or sleep mode.

Better solutions are needed, such as an automated system to disable texting and other distracting cell phone features while driving so that drivers can focus their attention on the road and their immediate environment in an effort to reduce injury and death on our nation's highways.

The present state of the art may therefore benefit from the systems, methods, and apparatuses for implementing a vehicle safety lock assembly as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 7A and 7B depict flow diagrams illustrating a method for implementing a vehicle lock assembly system, in accordance with disclosed embodiments;

FIG. 8 illustrates a diagrammatic representation of a machine in the exemplary form of a computer system, in accordance with one embodiment;

DETAILED DESCRIPTION

Figure 1A:
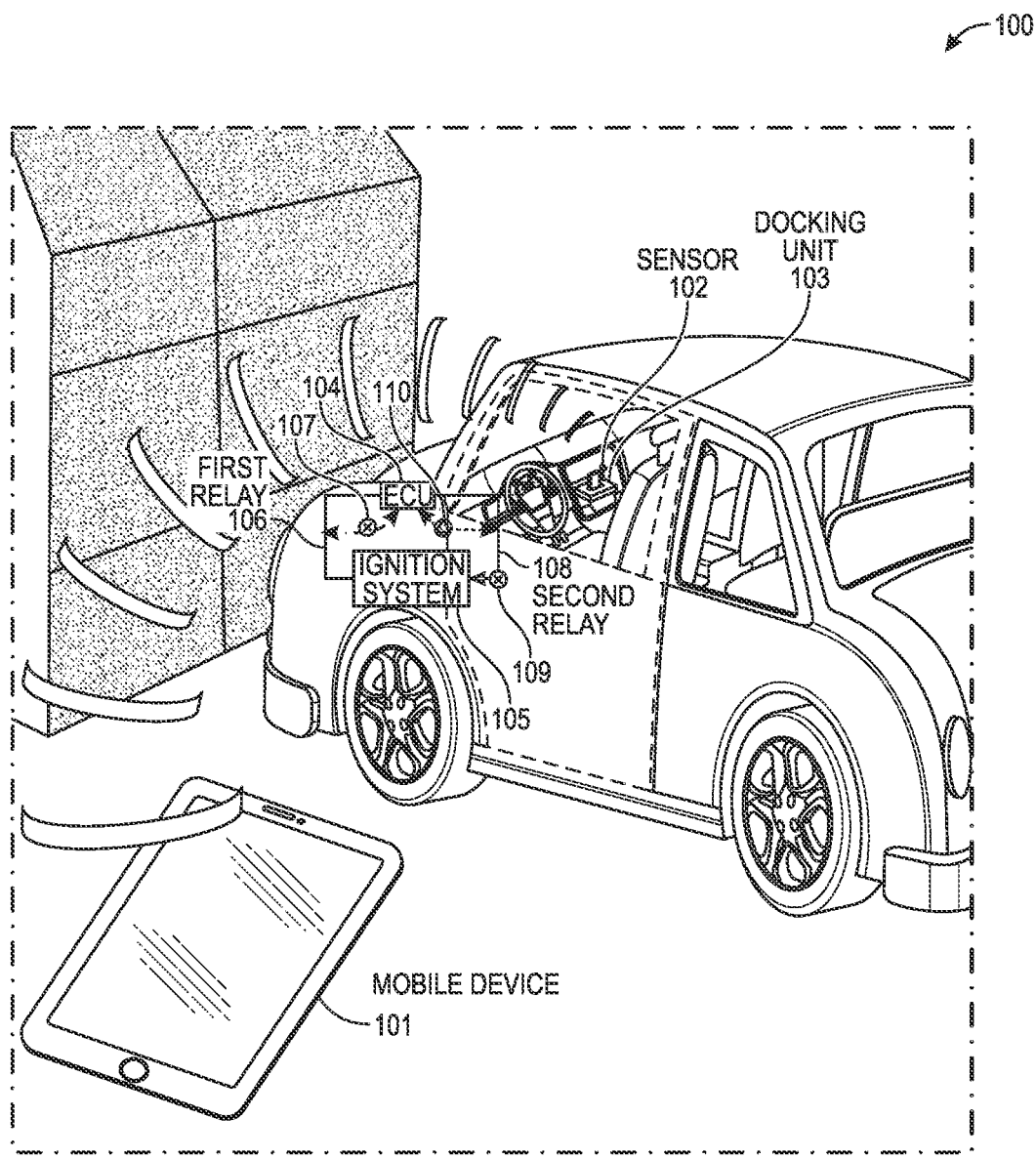
FIG. 1A provides an exterior perspective view of an exemplary vehicle safety lock assembly, in accordance with described embodiments.

Described herein are systems, methods, and apparatuses for implementing a vehicle safety lock assembly.

Ignition Interlock Devices (IIDs) available to the marketplace today incorporate breathalyzer technology and have been used to actively disable and re-enable the ignitions of automobiles for certain drivers, such as those charged or convicted of drunk driving incidents. Such breathalyzer technologies enable a connected system to check for and validate that the operator of a vehicle is to verify that they are not inebriated before being permitted to operate their vehicle. Typically a driver-operator will be forced by a court order to pay to have such a system installed into their vehicles after a drunk driving conviction or as part of a criminal diversion program structured to help the driver-operator avoid jail time while also instituting controls on the driver-operator's behavior as it relates to the use of the person's vehicle and the consumption of alcohol. With such technology, a driver-operator breathes into the breathalyzer and their blood alcohol content (BAC) is estimated by the device. If the driver-operator has a BAC above a specified threshold, then the driver-operator is prevented from driving that vehicle.

The existing Ignition Interlock Devices (IIDs) available to the market place today may operate in various ways, such as actively triggering a relay that stays open, preventing the activation of the car's ignition if the breathalyzer determines that the drive-operator has "blown" a BAC above a specified threshold.

Certain Ignition Interlock Devices (IDs) may further capture and report other data, such as images of the user and geolocation information. Such data may be utilized, for example, to verify the identity of the charged driver as the person who breathed into the breathalyzer, and to compare information sources, such as whether or not a driver-operator attempting to drive the vehicle (e.g., such as a driver convicted of a drunk driving charge) is within a pre-designated vicinity of a bar on geo-location information captured by the Ignition Interlock Device (IID).

The present invention brings certain critical improvements to the state of the art over those which are presently known and available to the market place and is distinguishable from prior known techniques and Ignition Interlock Devices (IIDs) in several important ways.

For instance, prior known Ignition Interlock Device (IID) technology is limited to ensuring that certain criteria are met before a vehicle ignition is activated, thus, the control structures are only truly given consideration at the time that the driver-operator attempts to activate or "start" their automobile, thus leaving significant opportunities to manipulate or overcome the safeguards.

Conversely, Applicants disclose herein novel techniques for ensuring that specified safeguards either cannot be overcome or are made to be significantly more difficult to defeat, thus greatly increasing the cost and complexity of non-compliance and in so doing, strongly encouraging driver-operators to comply or conform to instituted safeguards, such as not utilizing SMS texting and telephone functions while driving.

Although the examples set forth herein relate specifically to the prohibition and prevention of SMS texting and telephone functions while driving, other behaviors may be readily addressed, such as the ability to control the ignition system for a vehicle subject to a driver-operator "blowing" a BAC below a specified threshold by interfacing a breathalyzer to the described system and receiving and evaluating input received at the system from such a breathalyzer. Other behavior controls may be set, such as the ability to drive a vehicle during certain hours or the ability to operate a vehicle within a specified geographic region, the ability to operate a vehicle in certain environmental and weather conditions, the ability to operate a vehicle at or above certain speeds, the ability to operate a vehicle with a certain number of passengers, the ability to operate a vehicle within or outside of a specified navigational route, and so forth.

Described embodiments further introduce novel control mechanisms such as considering (and typically mandating) that a specific driver's phone is confirmed to be docked into a docking unit within the vehicle before the vehicle's ignition can be activated. Additional control mechanisms utilized by the disclosed embodiments further utilize functions occurring while the vehicle is turned on and in an operating and drivable condition. Thus, distinguished from prior systems which prevent a vehicle from operating, disclosed embodiments include the ability for limiting or disabling certain functions while a vehicle is operating, such as the ability to disable specified cell phone and smart phone features such as texting, web browsing, and media streaming.

Further still, the disclosed embodiments set forth herein go beyond that which is possible with prior known techniques by utilizing a novel technique for managing the ignition control of a vehicle. For instance, according to certain embodiments, there is a first relay configured between an electrical signal from a device such, as a smartphone, and the vehicle's ignition, either directly or indirectly through the vehicle's electrical control unit (ECU) which is capable of controlling many functions of the vehicle, such as the ability to control (by or through the ECU) the engine and ignition states and operations.

According to related embodiments, additional smart phones or mobile devices may be registered for use with the vehicle safety lock assembly via authentication with a connected cloud service. This feature allows for other drivers to drive the vehicle in question while having their devices restricted as well. The registration process may involve, for example, the original registrant of the mobile device registering other mobile devices or giving permission for the registration of other mobile devices with the vehicle safety lock assembly via an app executing on the smart phone or mobile device of the original registrant (e.g., a father may grant permission to a child or to a friend to drive the vehicle subject to the specified constraints).

For instance, according to a particular embodiment, there is a vehicle safety lock assembly system including a sensor of a docking unit to sense a nearby mobile device, in which the docking unit is coupled with a vehicle having an electronic control unit, an ignition system, and a first relay, in which the first relay is to signal from the electronic control unit to the ignition system to start the vehicle's ignition. According to such an embodiment, the docking unit is configurable to request a first inhibitory signal from a cloud service and to forward the first inhibitory signal to the electronic control unit to inhibit the first relay. The exemplary docking unit is further configurable with a transmitter to send a docking signal to the cloud service indicating that the mobile device has been docked at the docking unit, a receiver to receive a registration confirmation signal indicating that the mobile device is registered with the cloud service; in which the docking unit is to send a second inhibitory signal, responsive to receiving the registration confirmation signal to restrict functionality of pre-selected features on the mobile device when the mobile device is docked; the docking unit to send an authentication request to the cloud service requesting authentication for the mobile device; the docking unit to receive authentication from the cloud service and to forward the authentication to the electronic control unit, in which the electronic control unit is to authenticate the mobile device based on the authentication; and further in which the docking unit is to transmit a releasing signal through the electronic control unit upon authentication to start the vehicle's ignition.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Turning to the figures, various embodiments of the invention are set forth in greater detail below in the context of the illustrative examples depicted.

FIG. 1A provides an exterior perspective view of an exemplary vehicle safety lock assembly, in accordance with described embodiments.

As shown here, there is a vehicle that is currently parked and has been configured with the vehicle safety lock assembly. The vehicle at rest interacts with mobile device 101 outside the vehicle through the vehicle's docking unit 103 by sensing the mobile device 101 within a detectable range via sensor 102 on docking unit 103. For instance, a proximity sensor or Bluetooth receiver or WiFi receiver may be utilized by the vehicle's docking unit 103 to detect the presence of the mobile device 101 being within range of the vehicle. According to certain embodiments, electronic device 101 may attach to docking unit 103 via a slot, and electronic device 101 may be oriented in vertical or horizontal fashion.

While an automobile is shown here, the invention is not so limited. Rather, the vehicle having the docking unit 103 integrated therein may take the form of car, truck, motorcycle, moped, scooter, bicycle, watercraft, aircraft, construction equipment such as a crane or excavator, farm equipment such as tractor or harvester, etc.

Modern vehicles are equipped with an Electronic Control Unit (ECU) 104 which is configurable to interface with an ignition system of such vehicles through, for example, a relay (first relay 106) that transmits electronic signals from the electronic control unit (ECU) 104 to an ignition system 105 to start the vehicle. According to exemplary embodiments, the vehicle safety lock assembly system is thus configured to prevent the vehicle from turning on before the mobile device 101 is sensed to be within proximity of the vehicle or alternatively prevents the vehicle from being turned on (e.g., started) or operated until such time that the vehicle safety lock assembly system has affirmatively determined that the mobile device is actually docked with the docking unit 103 of the vehicle.

Further still, the vehicle safety lock assembly system will actively disable or restrict certain features, such as disabling SMS (e.g., texting) and along with other features, such as social media applications, all of which may contribute to distracting a driver-operator of the vehicle.

In certain embodiments, the vehicle safety lock assembly system operates to affirmatively disable or restrict certain features or functions, such as inhibiting use of cellular Internet connectivity, prohibiting use of WiFi, prohibiting use of a 4G/5G/LTE transceiver, etc. In other embodiments, the vehicle safety lock assembly system affirmatively prohibits use or activation of a specified list of applications, such as disabling an SMS application and disabling use of a FaceBook application and an Instagram application by the mobile device. Conversely, the vehicle safety lock assembly system is also configurable to disable all non-system or non-core applications (e.g., any application which is capable of being installed and uninstalled or enabled and disabled by a user without root access for the mobile device) unless specified via a white-list of permitted applications for the mobile device. For instance, by disabling all such applications, the vehicle safety lock assembly system may permit the driver-operator of the vehicle to utilize the vehicle while blocking user applications such as SMS text messaging, FaceBook, Instagram, etc., and yet, permit certain selectively approved applications, such as the use of a Navigation application on the mobile device or the use of, for example, a driver's Lyft, Uber, or GrubHub application.

In still other embodiments, certain features and applications on the mobile device may be activated and deactivated by the vehicle safety lock assembly system based upon current operating condition of the vehicle. For instance, the vehicle safety lock assembly system may disable such applications when the vehicle is not in "Park" or when the parking brake is not set and then enable or permit use of such applications when the vehicle is determined to be within an operating state such as being in "Park" or having the parking brake set or when the vehicle is turned off or when the vehicle is operating in accessory only mode (e.g., the engine is not running), etc.

With respect to "docking" of the mobile device to the docking unit 103 of the vehicle safety lock assembly system, the exemplary mobile device may be docked by physically placing the mobile device into a customized receptacle or slot on the docking unit 103. The docking unit 103 may be placed inside the vehicle near the driver's seat, such as by being integrated into a console between the driver and passenger seats (see FIG. 3A).

If the mobile device is a smart watch, it may be "docked" simply be being within a specified range of the docketing unit 103, as determined by a proximity sensor or other distance sensing component. For instance, the mobile device may be considered docked when the vehicle safety lock assembly system determines that the mobile device is positioned interior to the vehicle or positioned approximately within the seating position of the driver's seat or operator's seat of the vehicle, etc.

The vehicle safety lock assembly system may prevent the vehicle's ignition from starting by preventing the vehicle's electronic control unit 104 from signaling the vehicle's ignition system 105 to start the ignition via inhibiting the first relay 106.

According to certain embodiments, the docking unit 103 may request an inhibitory signal from a cloud service 212 associated with an app on the mobile device 101 associated with the vehicle safety lock assembly system in order to prevent the vehicle ignition from starting or turning "on" and thus becoming operable. According to a particular embodiment, once the docking unit 103 receives the inhibitory signal from the cloud service 212, the inhibitory signal is forwarded to the vehicle's electronic control unit 104 which then in turn forwards the inhibitory signal to the first relay 106, thus inhibiting the first relay 106 so as to prevent the vehicle's ignition from starting. Such a sequence may be considered a "cloud push" sequence in which the cloud service must be in communication with the vehicle so as to effectuate the inhibitory signal.

Other approaches may alternatively be utilized so as to control the inhibitory signal and its delivery to the vehicle.

With the cloud push sequence, the inhibitory signal operates to inhibit the vehicle so long as the vehicle is in communication with the cloud service, and thus, if the cloud service is inoperable or if the communication is broken between the vehicle and the cloud service, then the inhibitory signal would not reach the vehicle and the vehicle could thus be operated. This may be a preferred approach where it is uncertain if the vehicle will always have communication with the cloud service, thus avoiding a situation where the vehicle cannot be operated due to a lack of communication to the cloud service.

According to a different embodiment a "cloud pull" sequence may be utilized which is far more restrictive, in which case the inhibitory signal is pushed to the vehicle's ignition system through the ECU by default by the docking unit, regardless of whether the vehicle has communication with the cloud service. In such an embodiment, the docking unit will request a release of the inhibitory signal from the cloud service and then release the inhibitory signal on the vehicle's ignition system, thus permitting the system to operate.

Such an approach is more restrictive, but may be appropriate for vehicles such as tractors, semi-trucks, forklifts, excavators, and other such equipment for which a higher degree of security is desired and for which the vehicle in question is unlikely to lose communication with the cloud service.

In all cases, the docking unit may be configured to interface with an app or application on the mobile device of the user or the owner which may be pre-configured with a security token that is can be released by the owner to the docking unit to either push the inhibitory signal to the vehicle's ignition system or to release an inhibitory signal from the vehicle's system.

In such a way, an owner or authorized user may always enable and authorize operation of the vehicle, even when the vehicle is out of communication with the cloud service.

In certain embodiments, a cloud service may not be actively utilized, in which case, the owner or authorized user will use the app on their mobile device to release the token or release instructions to withdraw an inhibitory signal from the vehicle, thus permitting operation of the vehicle in the absence of a configured cloud service.

In related embodiments, the app may facilitate the release of the inhibitory signal or the placement of the inhibitory signal based on interaction with the app or based on sensor inputs received via the app. For instance, the app may push the inhibitory signal to the vehicle until such time that all non-authorized functions and applications are terminated or restricted, at which point, the app then releases the inhibitory signal and thus permits the vehicle to operate.

Consider for example, a teenager having access to a vehicle and the parent specifies via configuration settings in the app that Facebook, Instagram, SMS texting, etc., must be shut down before the vehicle may be operated by the teenager. Or alternatively, the parent specifies that only phone and navigation may be utilized on the teenager's smart phone while the vehicle is in an operating and drivable mode.

In such a situation, with or without the cloud service, the owner or parent's app on their mobile device can delegate access to the vehicle for the teenager through the teenager's smart phone. However, unlike the parent or owner, the teen does not have unfettered access to all functions of the app or the vehicle. Thus, the teenagers app may be configured in such a way as to possess a security token or other capability to release the inhibitory signal and permit the vehicle to operate, but subject to the conditions specified by the parent or owner's app, which are enforced by the application on the teenager's phone. Thus, for the teenager to operate the vehicle, the teenager must authorize the app to shutdown all non-permitted applications on the teenager's phone or the teenager must themselves shut down such applications. Once the teenager's phone is limited (according to this specific example) only navigation and phone calls, then the inhibitory signal will be released by the docking unit transmitting the instruction to release the inhibitory signal through the vehicle's ECU, thus permitting the vehicle to operate as normal.

According to certain embodiments, the docking unit 103 may generate this inhibitory signal itself as well as elect to release the inhibitory signal itself, without any involvement from the smart phone of the owner or other authorized user and without any involvement from any cloud service.

The mechanism of the inhibitory signal once applied to the first relay 106 may include, for example, disabling the first relay 106 by completely blocking any part of its electronic signaling pathway by locking or disabling its electronic circuit. According to certain other embodiments, the ignition may be prevented from turning on by targeting the electronic control unit 104 itself, via inhibitor 107 which inhibits it from signaling to the first relay 106, or on the other side of the pathway, preventing the ignition system 105 from receiving the electronic signal from the first relay 106. According to yet other embodiments, a second relay 108 may be a part of the vehicle safety lock assembly system which may be activated 110 by the electronic control unit 104 and function to override the first relay 106 and inhibit 109 the ignition system 105, preventing the ignition from turning on.

The vehicle has the vehicle safety lock assembly system installed, for example by installing docking unit 103 and other hardware into the vehicle and configuring the docking unit 103 and associated hardware to interface with the vehicle's electronic control unit 104 and ignition system 105. This installation may be done at the time of manufacture by the manufacturer or a third-party reseller or in the aftermarket by a third-party reseller, similar to the manner in which certain vehicles are manufactured with alarm systems and ignition shut-offs whereas other vehicles have such functionality installed after the point of manufacture by a third-party reseller.

According to certain embodiments, mobile device 101 such as a smartphone has been registered on an app as a known and authenticated mobile device which is then associated with the vehicle safety lock assembly system for a particular vehicle. The mobile device 101 may be registered on the app for example by entering a code unique to the docking unit 103 or the docking unit 103 sensing the device via a sensor 102 on the docking unit 103 and prompting an unregistered mobile device 101 to register via the app and authenticate with the vehicle safety lock assembly system via entering a serial number, two-factor authentication, touch ID, or by other means. Authenticating mobile devices prevents random mobile devices sensed by the docking unit 103 from registering and being able to interact with the vehicle safety lock assembly system and possibly being able to access the vehicle's electronic control unit 104 and ignition system 105 to unlock the vehicle and steal it or access the interior of the vehicle. For example, a sensor 102 on the docking unit senses that a registered mobile device 101 is nearby and within range of the sensor 102. The sensor 102 may sense the undocked mobile device 101 outside of the vehicle or inside of the vehicle.

According to certain embodiments, the docking unit 103 may sense that the user's mobile device 101 is nearby even when the vehicle is turned off, for example via Bluetooth, WiFi, satellite, or other means of tracking.

According to certain embodiments, features of the vehicle safety lock assembly system may provide a fall-back or failsafe mechanism to overcome problems arising from an inability of a mobile device 101 to authenticate with the vehicle safety lock assembly system for whatever reason. This may include, for example, configuring the vehicle safety lock assembly system to inhibit the vehicle ignition system 105 at the resting state when the vehicle is turned off and mobile device 101 is not docked with docking unit 103. Such inhibition at the resting state may be desirable to protect vehicles from being stolen via the hot-wiring of their ignitions by disabling ignition system 105 so that even hot-wiring may not be able to turn on the vehicle's ignition.

An inability of mobile device 101 to authenticate with the vehicle safety lock assembly system may be due to, for example, users losing their mobile devices or not being able to dock their mobile devices, for example due to damage to the mobile device 101 or the docking unit 103 from wear and tear, accidents, liquid damage, etc. In such situations, it may be necessary to authenticate with the vehicle safety lock assembly system in an alternate manner to be able to start the vehicle's ignition. This may include, for example, utilizing a fail-safe mechanism permitting a vehicle user or owner to authenticate via two-factor authentication with the cloud service provider providing a code to the user via another mobile device, electronic device, or an onboard (voice control) system of the vehicle, such as OnStar Roadside Assistance. The code may then be entered via a user dashboard, for example at a touchscreen display that may be a part of the vehicle safety lock assembly system, or at a keypad at the docking unit 103. According to certain other embodiments, such authentication may not be necessary, as the docking unit 103 will not sense that a registered mobile device 101 is nearby and thus will not override the first relay to inhibit the vehicle's ignition system 105 and as a result, the vehicle's ignition will not be inhibited and may be turned on as usual, depending upon whether the default state of the vehicle having the vehicle safety lock assembly system integrated therein is configured to the more restrictive inhibitory signal present as a default state, in which the docking unit sends instructions to release the inhibitory signal permitting the vehicle to operate or conversely, the less restrictive default state where the vehicle is not inhibited and the docketing unit sends an inhibitory signal to prevent the vehicle from operating pursuant to the instructions and configuration of the associated app on the user's mobile device.

Imagine further the situation in which a user has lost their mobile device 101 and is in a remote location without cellphone service or Internet connectivity, and the vehicle safety lock assembly system is continuously inhibiting the vehicle's ignition system 105. In such a situation where the user does not have cell phone service or Internet connectivity to obtain a code or otherwise authenticate with the vehicle via a cloud service or the Internet, an override mechanism is necessary to deactivate the vehicle safety lock assembly system's inhibition of the vehicle's ignition and allow for the vehicle to be turned on. Such an override mechanism may include, for example, fingerprint touch recognition at a user dashboard (touchscreen display) associated with the docking unit, the entry of a master emergency code at a keypad on the docking unit 103, or a master key to be inserted at docking unit 103. According to a particular embodiment, use of a physical key for either the vehicle or a physical key specific to the docking unit may be utilized as an override, thus providing a fail-safe and permitting the vehicle to operate.

According to certain embodiments, such an override mechanism may not be necessary as the fail-safe is the alternate default state in which the docking unit does not send the inhibitory signal to the vehicle's ECU, as the docking unit 103 will not sense that a user's registered mobile device 101 is nearby as the device is lost or otherwise not capable of being sensed and thus the vehicle safety lock assembly will not inhibit the vehicle's ignition.

The level of security and restrictiveness may also be configurable based on the vehicle owner's preferences. For instance, it may be that a parent will gladly permit their teenager to operate the vehicle without any such restrictions when the teenager's phone is not inside the vehicle. In such an example, the docking unit would not sense the teenager's phone and thus, the docking unit may be configured to simply never send any inhibitory signal to the vehicle's ECU. Thus, the car would operate as normal so long as the teenager's phone is not inside the car or not within a pre-defined proximity distance of the driver's seat.

Conversely, a business owner with a vehicle such as an excavator may elect for the more restrictive configuration in which the vehicle cannot be operated without a known and authenticated user docking their mobile device with the docking unit, thus enabling the vehicle to operate. As before, fail-safes and overrides may also be present and available to the owner, as needed.

Figure 1B:
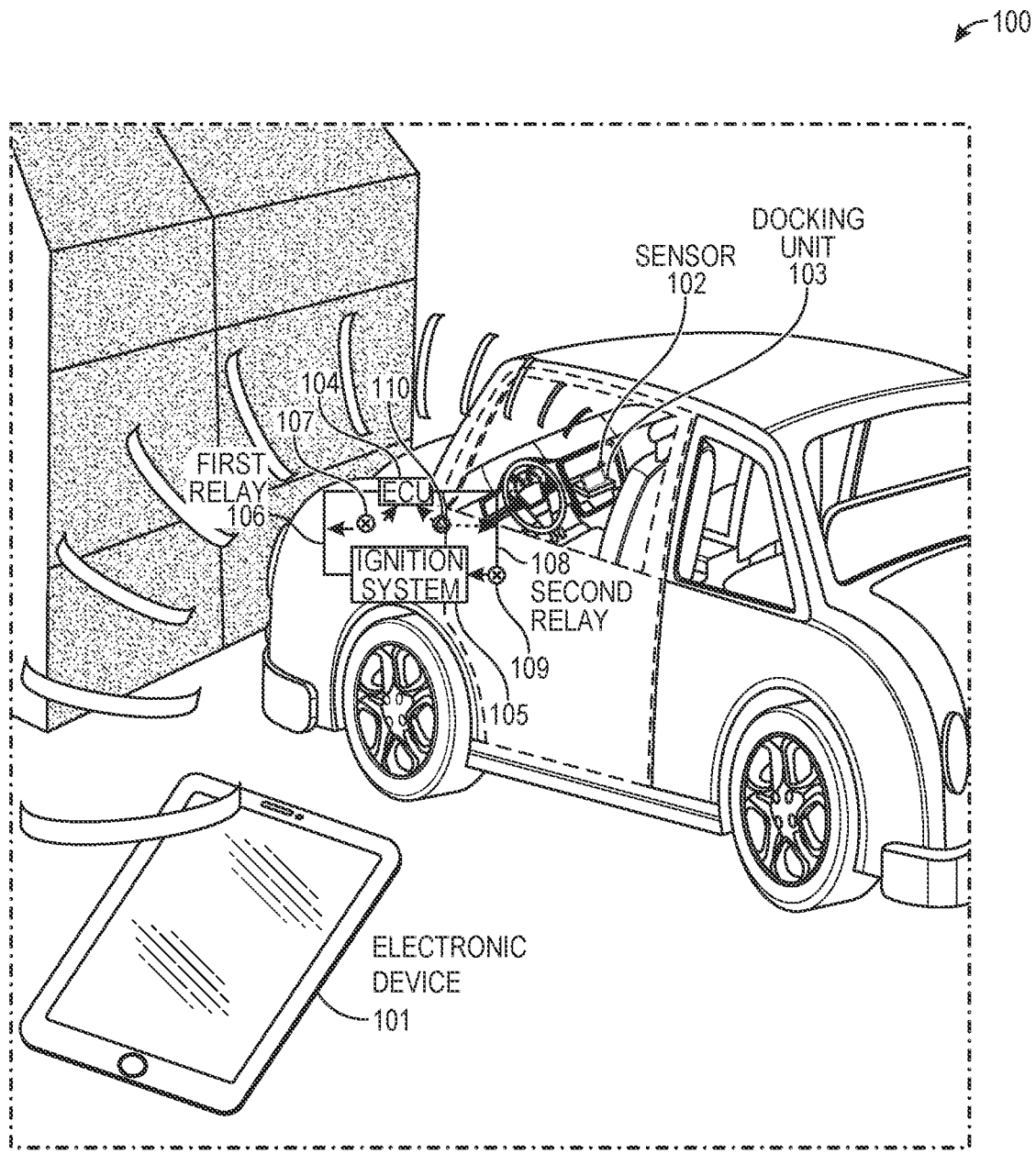
FIG. 1B provides another exterior perspective view of an exemplary vehicle safety lock assembly, in accordance with described embodiments.

FIG. 1B provides an exterior perspective view of an exemplary vehicle safety lock assembly, in accordance with described embodiments.

According to certain embodiments, electronic device 101 may rest on top of docking unit 103, for example in horizontal or vertical orientation.

Figure 2A:
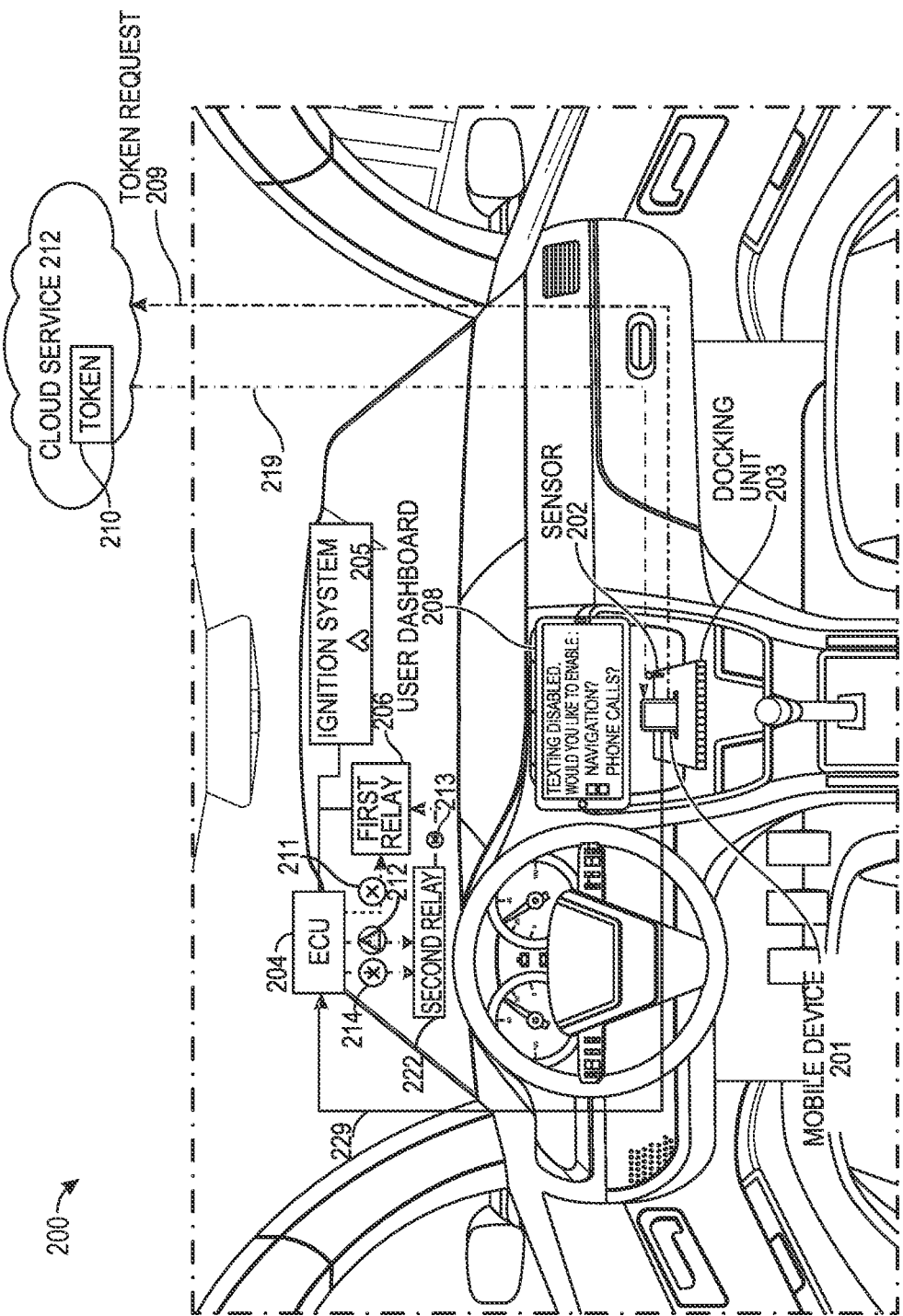
FIG. 2A is a perspective in-use view of a vehicle safety lock assembly, in accordance with described embodiments.

FIG. 2A is a perspective in-use view of a vehicle safety lock assembly, in accordance with one embodiment.

Following the events described in FIG. 1 involving the docking unit 203 sensing mobile device 201 before docking and inhibiting ignition system 205 as a result, for example via electronic control unit 204 inhibiting 211 the first relay 206 or activating 212 a second relay 213, the mobile device 201 is subsequently docked with docking unit 203. A token request 209 is sent to cloud service 212 to request authentication of mobile device 201. The cloud service 212 generates a token 210 which is sent 219 to the mobile device 201. Token 210 may take various forms and include a passcode, two-factor authentication, digital image, sound, etc. The mobile device then sends the token 210 to the electronic control unit 204 which authenticates the token 210. According to certain embodiments, the mobile device 201 may pass token 210 on to docking unit 203 for authentication.

Following authentication of token 210, electronic control unit 204 moves to activate ignition system 205 to allow for the vehicle ignition to be turned on. This may be accomplished by electronic control unit 204 removing inhibition 211 on first relay 206. Alternatively, electronic control unit 204 may inhibit 214 second relay 222 from inhibiting 213 first relay 206, thus releasing inhibition 213 on first relay 206 and allowing first relay 206 to activate ignition system 205 and turn on the vehicle's ignition.

Once the mobile device 201 is docked with docking unit 203, an app on the mobile device 201 associated with a cloud service 212 may automatically launch, and pending the authentication process described above, various functionality on the mobile device 201 may be restricted or disabled based on pre-configured settings. This restriction may be in the form of another inhibitory signal sent 219 to the mobile device 201 by the cloud service 212, such as instructions sent to the mobile device to shut down specific applications and services, based on permission settings of the app on the mobile device. According to other embodiments, the user of the mobile device may need to log into the app or enter a passcode or perform touch verification to launch the app and subsequently activate the vehicle safety lock assembly system.

There are other ways that a user of mobile device 201 may interact with the mobile device 201 while the mobile device 201 is docked with the docking unit 203 or sensed by the docking unit 203. According to certain embodiments, the vehicle safety lock assembly system may include a display (user dashboard 208) which may, for example, be a touch-screen mounted above the docking unit 203. User dashboard 208 may show the display of mobile device 201 as well as other prompts such as a menu of features that a user may activate on the mobile device 201. According to other embodiments, a vehicle media control device such as a wrist-watch style device may be mounted to the steering wheel of the vehicle and have buttons for accessing and controlling select features of the mobile device 201 such as phone calls or navigation (based on Applicant's design patent USD878982S "Vehicle Media Control Device"). See FIG. 4 and FIG. 5.

According to certain embodiments, upon docking of the mobile device 201 and activation of the app, a user may be prompted, either through the mobile device 201, the user dashboard 208, or the vehicle media control device, to select from a pre-configured menu of features on mobile device 201 that they would like to be able to enable and interact with while the mobile device 201 is docked. Such features may include, for example, audio/phone calls and navigations features such as Google Maps. According to certain other embodiments, the vehicle safety lock assembly system may disable or restrict other devices coupled with or integrated into the vehicle such as GPS navigation systems or satellite radio when mobile device 201 is docked. A user may have the option to or be prompted to enable such devices as well via user dashboard 208.

According to certain embodiments, the features inhibited on the mobile device 201 after docking may include texting, video calls, web browsing, and most apps, but may exclude voice calls, navigation apps and emergency communication features such as dialing 911 or roadside assistance. Stated differently, one possible and likely configuration would be to permit 911 calls, emergency communications, navigation, and possibly voice calls depending upon the vehicle owner's preferences, but restrict all other services such as SMS texting, social media, etc.

According to certain other embodiments, the vehicle safety lock assembly system offers advantages beyond aspects relating to starting a vehicle and disabling mobile device features while a vehicle is turned on. For example, the vehicle safety lock assembly system may be able to detect collisions and subsequently contact and send information to emergency services. Specifically, the vehicle safety lock assembly system may monitor acceleration or other factors indicating a collision and be triggered to send automated notifications, data or calls to emergency services when a threshold measurement is met or exceeded. Such communications may include employing emergency SMS alert systems, text-to-911 or text relay services, and transmitting geolocation and user contact information.

Vehicles airbags, for example, typically deploy based on sensors measuring impact into a rigid wall at 8-18 mph and detecting the corresponding acceleration and deceleration as measured by an accelerometer. Accelerometers found in vehicles may measure vehicle acceleration and deceleration on multiple different axis to differentiate between fast acceleration/braking without a collision and a collision. According to certain embodiments, sensors used as part of the vehicle safety lock assembly system may be based on measuring changes based on pressure. However, sensors detecting changes in acceleration and deceleration may be preferred as they afford a greater degree of reliability in comparison to sensors detecting changes in pressure.

According to yet other embodiments, the accelerometer may be alternatively or additionally an app on mobile device 201 instead of being hard-wired into the vehicle. In such instances, the app would be confirming or measuring changes in kinetic (physics-related) parameters affecting the mobile device 201, which would coincide with the kinetic parameters affecting the vehicle. It is important to note that in these scenarios, the mobile device 201 is docked with the docking unit 203, differentiating it from the situation where the mobile device 201 is not docked and the accelerometer app on the mobile device 201 measures a threshold or higher deceleration, when for, example, the mobile device 201 is dropped or thrown. In such a situation, even if a threshold measurement for acceleration, deceleration, or pressure was met, it would not trigger an outgoing communication to emergency services as mobile device 201 is not docked to the docking unit 203 inside a vehicle.

According to certain embodiments, mobile device 201 may attach to docking unit 203 via a slot, and mobile device 201 may be oriented in horizontal or vertical fashion.

Figure 2B:
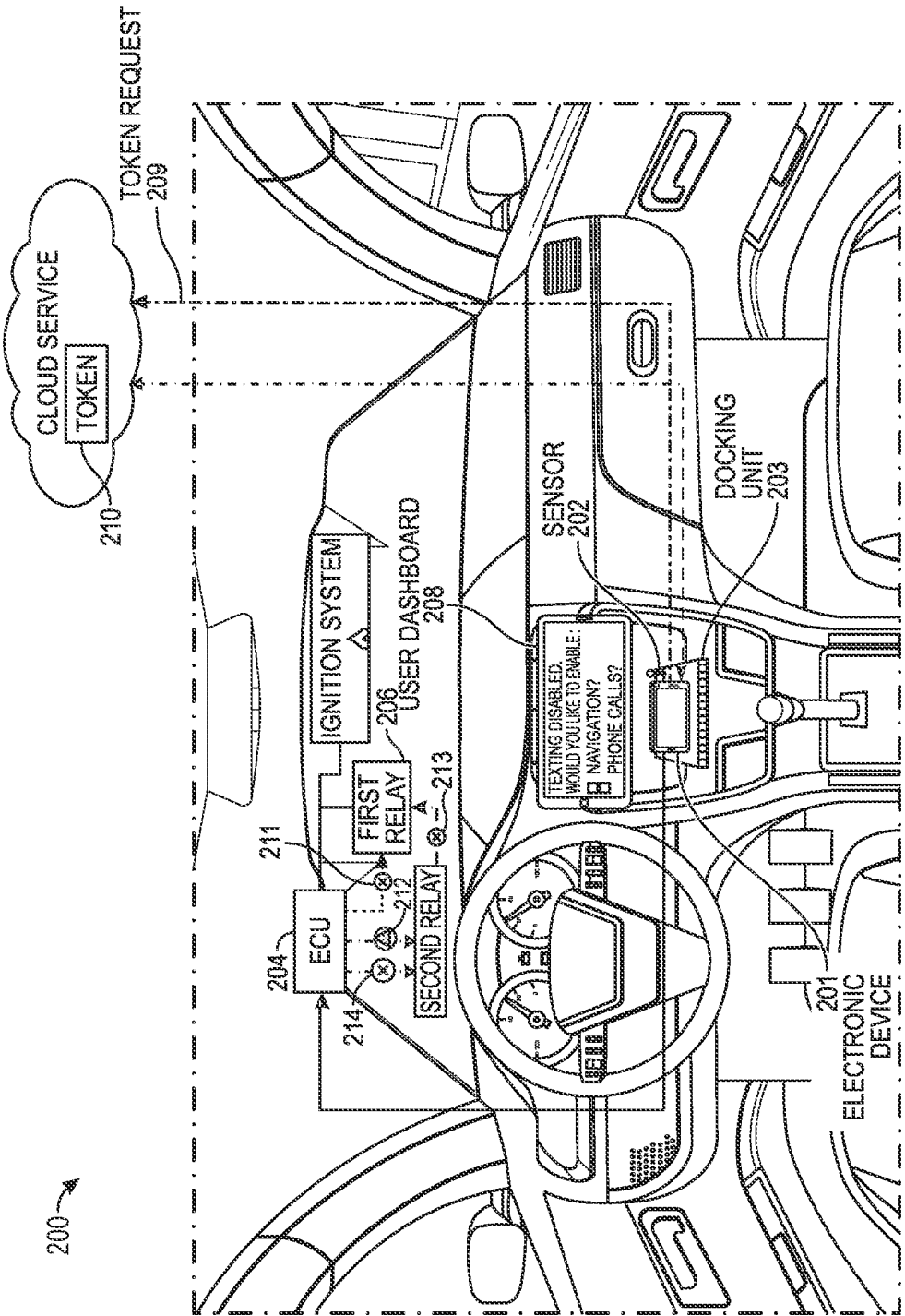
FIG. 2B is another perspective in-use view of a vehicle safety lock assembly, in accordance with described embodiments.

FIG. 2B is another perspective in-use view of a vehicle safety lock assembly, in accordance with one embodiment.

According to certain embodiments, electronic device 201 may rest on top of docking unit 203, and electronic device 201 may be oriented in horizontal or vertical fashion.

Figure 2C:
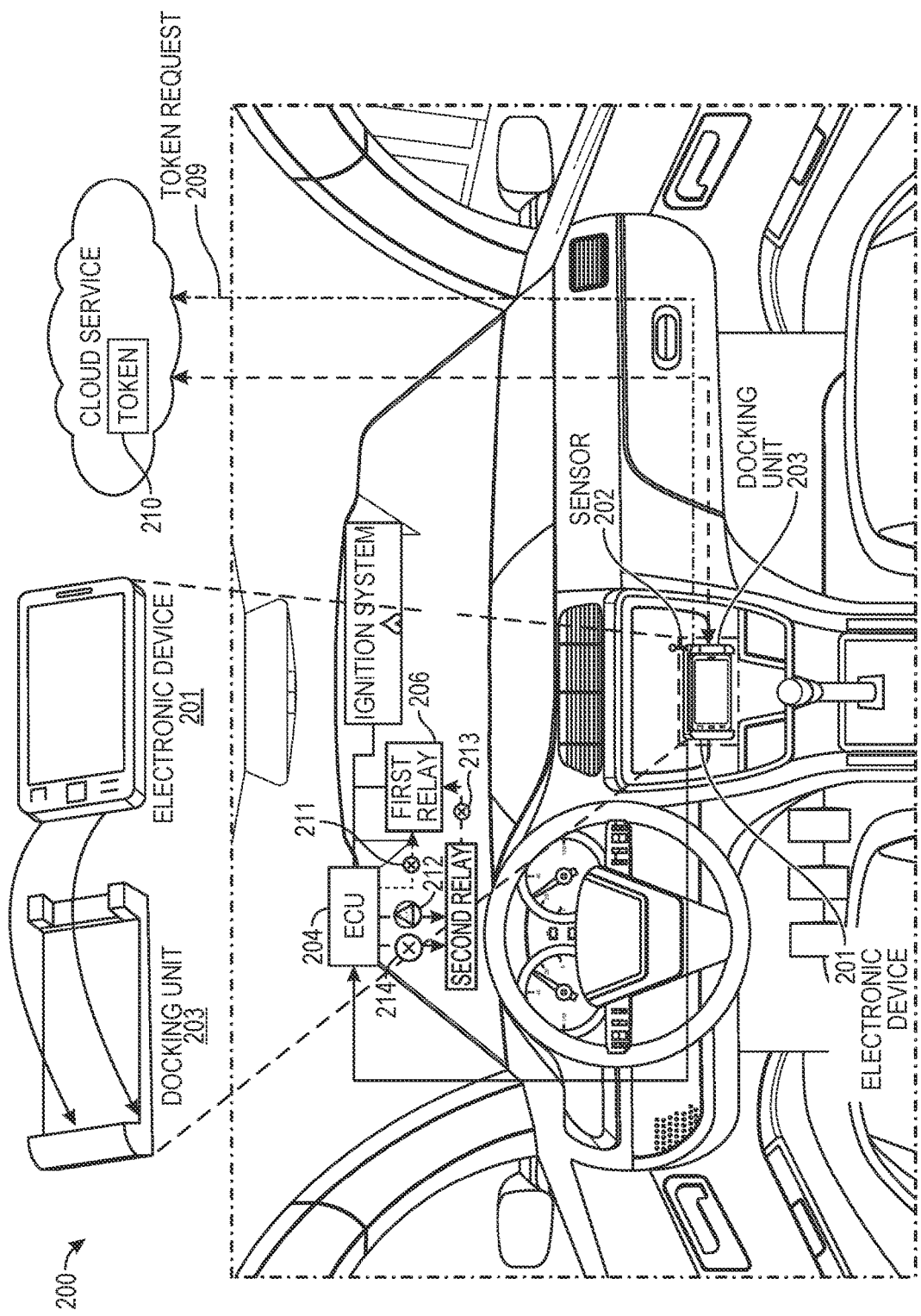
FIG. 2C is yet another a perspective in-use view of a vehicle safety lock assembly, in accordance with described embodiments.

FIG. 2C is yet another perspective in-use view of a vehicle safety lock assembly, in accordance with one embodiment.

According to certain embodiments, docking unit 203 may contour around electronic device 201 when electronic device is placed into docking unit 203, similar to a smart phone belt clip. Furthermore, docking unit 203 be mounted to a vehicle console in horizontal or vertical orientation. This may be particularly advantageous in vehicles or older cars not having built-in navigation systems or displays, as electronic device 201 may serve as a navigation system and, when secured into docking unit 203 mounted to the vehicle console, electronic device 201 serves as a display as well.

Figure 3A:
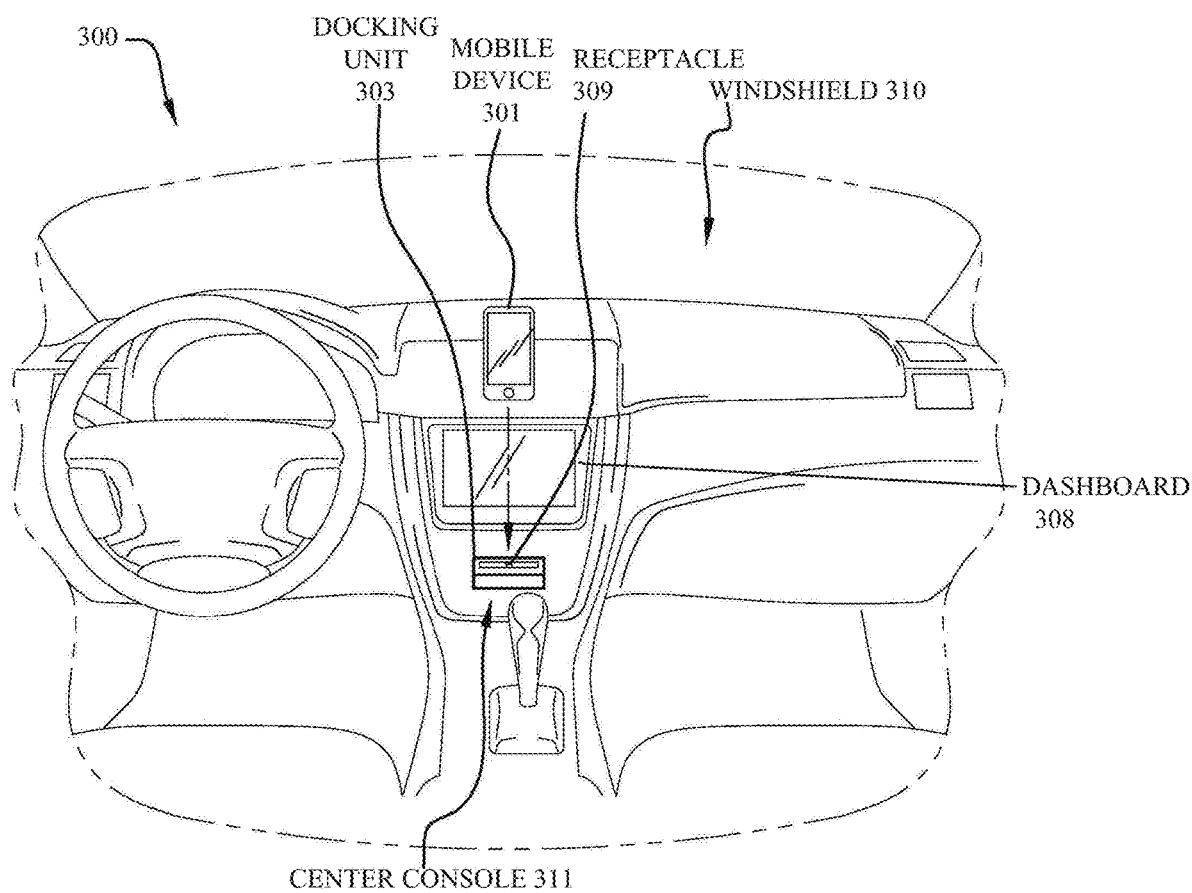
FIG. 3A is another perspective in-use view of a vehicle safety lock assembly, in accordance with described embodiments.

FIG. 3A is another perspective in-use view of a vehicle safety lock assembly, in accordance with one embodiment.

As shown here, docking unit 303 may be integrated into center console 311 of a vehicle between the driver and passenger seats. Docking unit 303 contains a receptacle 309 to receive and secure mobile device 301. According to certain embodiments, dashboard 308 (user dashboard 208) may also be integrated into the vehicle and vehicle safety lock assembly to provide more convenient user interaction while mobile device 301 is docked with docking unit 303.

Figure 3B:
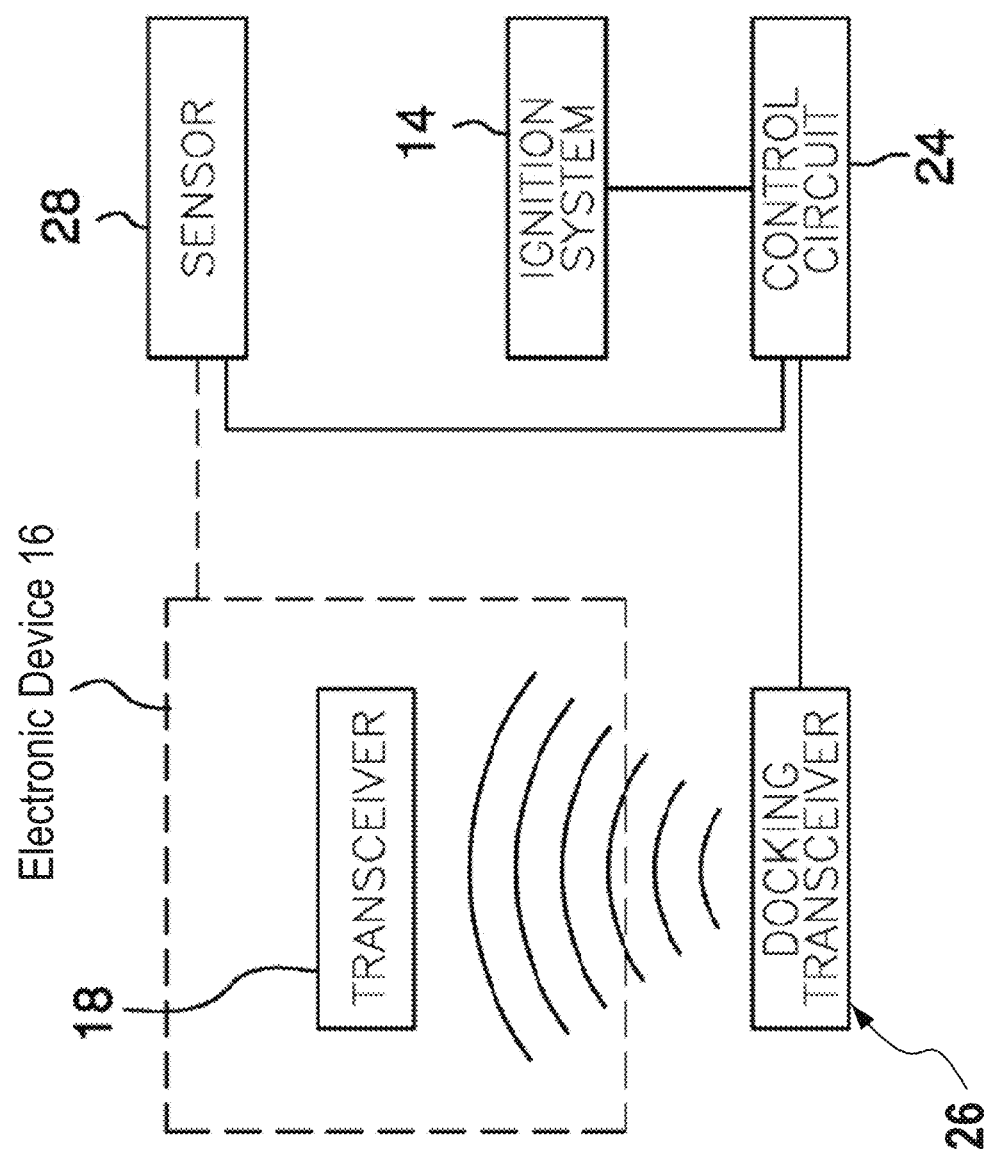
FIG. 3B is a schematic view of an embodiment of the disclosure, in accordance with one embodiment.

FIG. 3B is a schematic view of an embodiment of the disclosure, in accordance with one embodiment.

As is illustrated here by way of FIGS. 3A and 3B, the vehicle safety lock assembly 300 generally comprises a vehicle 310 that has an ignition system 14. The vehicle 310 may be a passenger vehicle 310 or any other motorized vehicle 310. An electronic device 16 is included and the electronic device 16 has a transceiver 18. The electronic device 16 may be a smart phone or other similar wireless communication device, such as mobile device 301 as described herein.

A docking unit 303 is depicted here as being integrated within or coupled to the vehicle 310. As shown, the docking unit 303 is positioned in an interior of the vehicle 310 to be accessible to a driver. The docking unit 303 is electrically coupled to the ignition system 14 and the docking unit 303 is in wireless communication with the electronic device 16 when the electronic device 16 is brought into the vehicle 310. The docking unit 303 senses when the electronic device 16 is positioned therein for storage. Moreover, the docking unit 303 turns the ignition system 14 off when the docking unit 303 senses the electronic device 16 has been brought into the vehicle 310 and the electronic device 16 is not positioned in the docking unit 303, according to a particular embodiment. In this way, the docking unit 303 inhibits the vehicle 310 from being driven while the electronic device 16 (e.g., mobile device 301) is available to be used by the driver. The docking unit 303 turns the ignition system 14 on when the electronic device 16 is brought into the vehicle 310 and the electronic device 16 is positioned in the docking unit 303.

The docking unit 303 comprises a receptacle 309 that is positioned within the vehicle 310. A control circuit 24 is positioned in the receptacle 309 of the docking unit 303 and the control circuit 24 is electrically coupled to the ignition system 14. The receptacle 309 may be a locking box, a smart phone dock and any other type of receptacle 309 that can physically engage or receive a smart phone for a wired interface or a device capable of wirelessly coupling with the mobile device 301 such as a Bluetooth receiver, a WiFi receiver, etc. A docking transceiver 26 may be integrated within the receptacle 309 and the docking transceiver 26 is thus electrically coupled to the control circuit 24. The docking transceiver 26 may be a radio frequency transceiver or the like and Bluetooth communication protocols. Additionally, the docking transceiver 26 may be in electrical communication with a wireless communication system in the vehicle 310 such as are included in hands-free telephony systems in modern vehicles (e.g. mobile phones, mobile devices, smart phones, etc.), as described elsewhere herein.

According to further embodiments, the docking transceiver 26 is in electrical communication with the transceiver 18 in the electronic device 16 when the electronic device 16 is brought within the vehicle 310 or brought within a proximity distance of the driver's or operator's seat for the vehicle. The docking transceiver 26 may have an operational range of, by way of example, approximately 2.0 meters, or some other detection range configurable to capture the driver's or operator's seating position within the vehicle, without detecting presence of the mobile device 301 or electronic device 16 within, for example, a passenger seat of the same vehicle.

In such a way, the vehicle safety lock system is configurable such that the docking transceiver 26 cannot communicate with the electronic device 16 or mobile device 301 until the electronic device 16 is brought at least within the vehicle 310 and optionally within a proximity range of the driver's or operator's seat, depending upon the chosen configuration.

According to one embodiment, the control circuit 24 receives a first input when the docking transceiver 26 is in communication with the transceiver 18 in the electronic device 16. Moreover, the control circuit 24 turns the ignition system 14 off when the control circuit 24 receives the first input. In this way, the control circuit 24 inhibits the vehicle 310 from being driven when the electronic device 16 (e.g., or the mobile device 301) is within the vehicle 310 and available for use by the driver or within proximity of the driver's seat or the vehicle operator's seat, and thus available for use by the vehicle driver or operator.

A sensor 28 is further coupled to the receptacle 309 and the sensor 28 is electrically coupled to the control circuit 24. The sensor 28 is placed in electrical communication with the electronic device 16 when the electronic device 16 is positioned in the receptacle 309. The control circuit 24 receives a second input when the sensor 28 is in electrical communication with the electronic device 16.

Additionally, the control circuit 24 turns the ignition system 14 on when the control circuit 24 receives the second input after receiving the first input. In this way, the control circuit 24 facilitates the vehicle 310 to be driven. The sensor 28 may be an electrical connector that engages a port on the electronic device 16 or other electronic sensor 28 that is capable of communicating with the electronic device 16.

When in use, the docking transceiver 26 detects the signal broadcast by the transceiver 18 in the electronic device 16 when the electronic device 16 is brought into the vehicle 310. Thus, the control circuit 24 receives the first input and turns the vehicle's 310 ignition system 14 off, according to a particular embodiment.

In this way, the vehicle 310 is inhibited from being driven while the electronic device 16 is active and inside the vehicle 310 or active and within a detectable proximity of the driver's or vehicle operator's seat. According to such an embodiment, the sensor 28 is placed in electrical communication (e.g. direct wired communication) with the electronic device 16 when the electronic device 16 is placed in the receptacle 309 or alternatively is placed into wireless communication with the electronic device 16 when the electronic device 16 is placed either interior to the vehicle or within the detectable proximity of the driver's or operator's seat of the vehicle. Thus, the control circuit 24 receives the second signal and turns the vehicle's 310 ignition system 14 on or otherwise enables normal operation mode of the vehicle (e.g., the vehicle may be placed into gear for a passenger vehicle or the vehicle may be operated in the case of, for example, heavy equipment, etc.). In this way, the vehicle 310 can be driven or operated without the possibility of the driver manipulating the electronic device 16 while driving thereby enhancing safety of operating the vehicle 310.

It is therefore in accordance with such embodiments that there is a vehicle safety lock assembly being configured to inhibit a smart phone from being used during driving, said assembly includes at least: a vehicle having an ignition system; an electronic device having a transceiver; and a docking unit being coupled to said vehicle and being positioned in an interior of said vehicle wherein said docking unit is configured to be accessible to a driver, said docking unit being electrically coupled to said ignition system, said docking unit being in wireless communication with said electronic device when said electronic device is brought into said vehicle, said docking unit sensing when said electronic device is positioned therein for storage, said docking unit turning said ignition system off when said docking unit detects that said electronic device is brought into said vehicle and said electronic device is not positioned in said docking unit thereby inhibiting said vehicle from being driven, said docking unit turning said ignition system on when said electronic device is brought into said vehicle and said electronic device is positioned in said docking unit.

According to another embodiment, the docking unit includes a receptacle being positioned within said vehicle.

According to another embodiment, vehicle safety lock assembly further includes a control circuit being positioned in the receptacle, the control circuit being electrically coupled to the ignition system. According to another embodiment, the vehicle safety lock assembly further includes a docking transceiver being positioned within the receptacle, the docking transceiver being electrically coupled to the control circuit, the docking transceiver being in electrical communication with the transceiver in the electronic device when the electronic device is brought within the vehicle.

According to yet another embodiment, the control circuit receives a first input when the docking transceiver is in communication with the transceiver in the electronic device. According to another embodiment, the control circuit turns the ignition system off when the control circuit receives the first input such that the control circuit inhibits the vehicle from being driven.

According to another embodiment, the vehicle safety lock assembly further includes a sensor being coupled to the receptacle, the sensor being electrically coupled to the control circuit, the sensor being placed in electrical communication with the electronic device when the electronic device is positioned in the receptacle. According to another embodiment, the control circuit receives a first input, the control circuit receiving a second input when the sensor is in electrical communication with the electronic device According to another embodiment, the control circuit turns the ignition system on when the control circuit receives the second input after receiving the first input such that the control circuit facilitates the vehicle to be driven.

In accordance with a particular configuration of the claimed embodiments, there is further disclosed a vehicle safety lock assembly being configured to inhibit a smart phone from being used during driving, the assembly including: a vehicle having an ignition system; an electronic device having a transceiver; a docking unit being coupled to the vehicle and being positioned in an interior of the vehicle in which the docking unit is configured to be accessible to a driver, the docking unit being electrically coupled to the ignition system, the docking unit being in wireless communication with the electronic device when the electronic device is brought into the vehicle, the docking unit sensing when the electronic device is positioned therein for storage, the docking unit turning the ignition system off when the docking unit the electronic device is brought into the vehicle and the electronic device is not positioned in the docking unit thereby inhibiting the vehicle from being driven, the docking unit turning the ignition system on when the electronic device is brought into the vehicle and the electronic device is positioned in the docking unit, the docking unit including a receptacle being positioned within the vehicle; a control circuit being positioned in the receptacle, the control circuit being electrically coupled to the ignition system; a docking transceiver being positioned within the receptacle, the docking transceiver being electrically coupled to the control circuit, the docking transceiver being in electrical communication with the transceiver in the electronic device when the electronic device is brought within the vehicle, the control circuit receiving a first input when the docking transceiver is in communication with the transceiver in the electronic device, the control circuit turning the ignition system off when the control circuit receives the first input such that the control circuit inhibits the vehicle from being driven; and a sensor being coupled to the receptacle, the sensor being electrically coupled to the control circuit, the sensor being placed in electrical communication when the electronic device when the electronic device is positioned in the receptacle, the control circuit receiving a second input when the sensor is in electrical communication with the electronic device, the control circuit turning the ignition system on when the control circuit receives the second input after receiving the first input such that the control circuit facilitates the vehicle to be driven.

Figure 4:
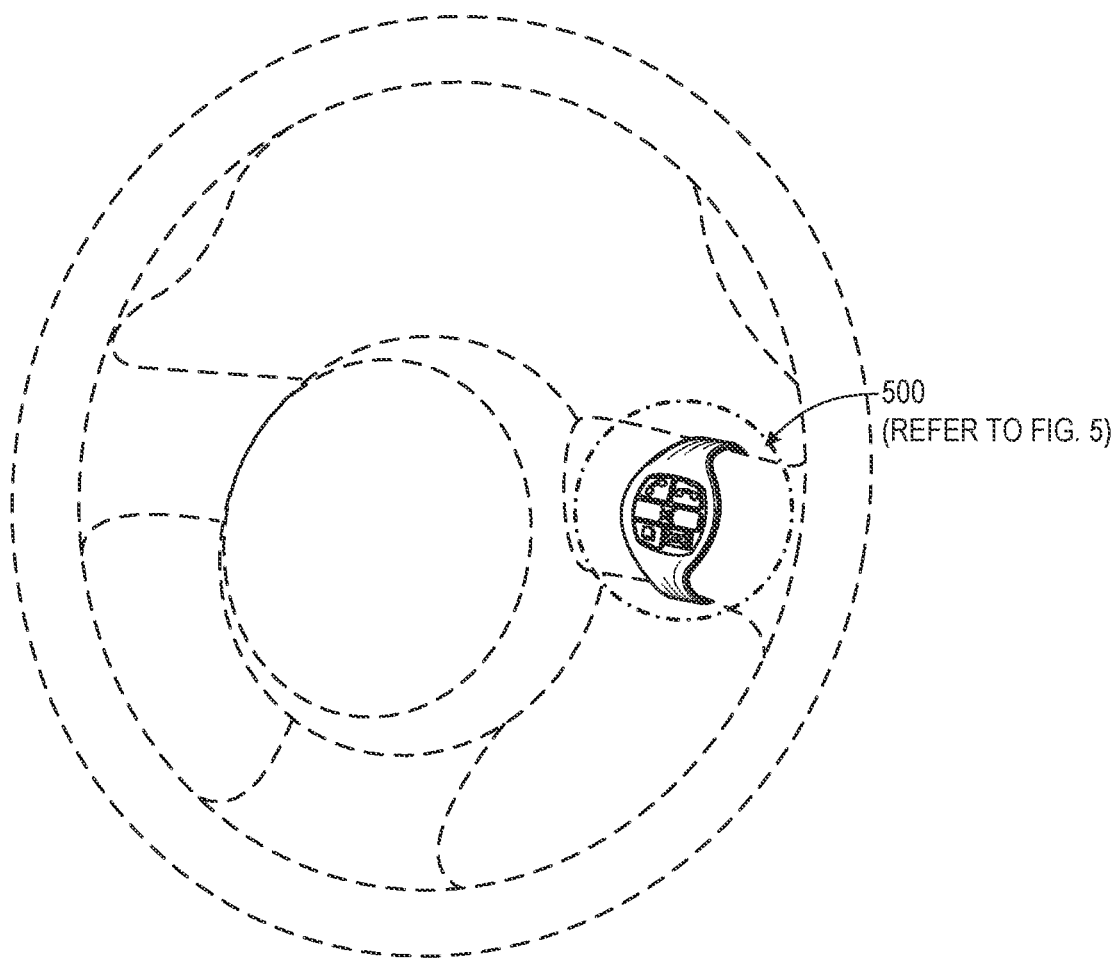
FIG. 4 is a top front side perspective of a vehicle media control device in use, in accordance with described embodiments.

FIG. 4 is a top front side perspective of a vehicle media control device in use.

As shown here, a vehicle media control device may supplement the vehicle safety lock assembly system to allow more convenient and faster interaction between a user and the mobile device. The vehicle media control device may be a wireless device secured at various points within the vehicle, including around the spokes of the steering wheel, to allow a user to quickly and easily access and control enabled features on the docked mobile device. According to other embodiments, the vehicle media control device may be secured or integrated into vehicle consoles, dashboards or gear shifts.

Figure 5:
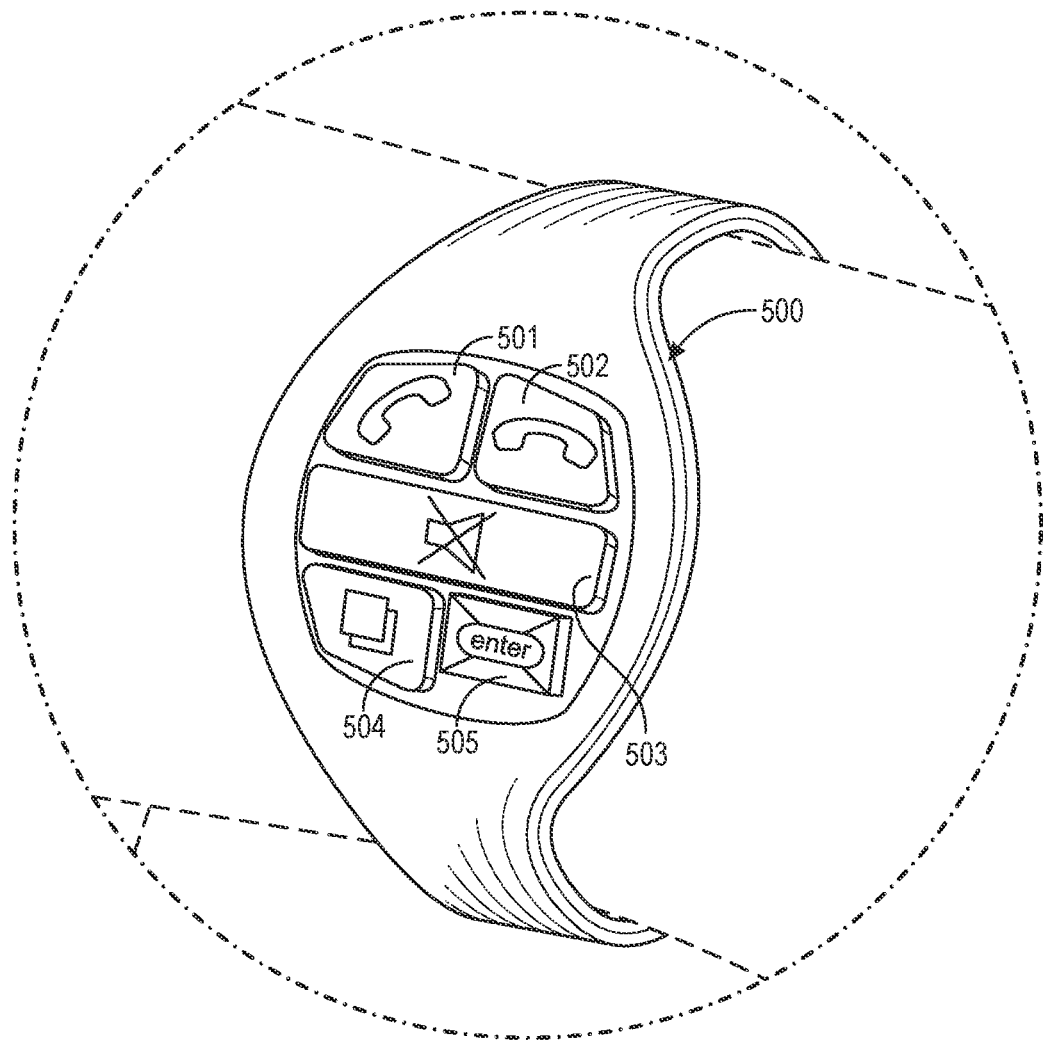
FIG. 5 is a detailed top front side perspective view of the vehicle media control device in use, in accordance with described embodiments.

FIG. 5 is a detailed top front side perspective view of the vehicle media control device in use.

As shown here, the vehicle media control device may include buttons, a touch display with icons, or other means of quickly and easily accessing and controlling various functions associated with the docked mobile device. According to one embodiment, button 501 may dial calls on the mobile device, button 502 may end calls, button 503 may mute the mobile device, button 504 may switch between enabled applications on the mobile device (for example between navigation and phone calls), and button 505 may select applications or options on the mobile device.

Figure 6:
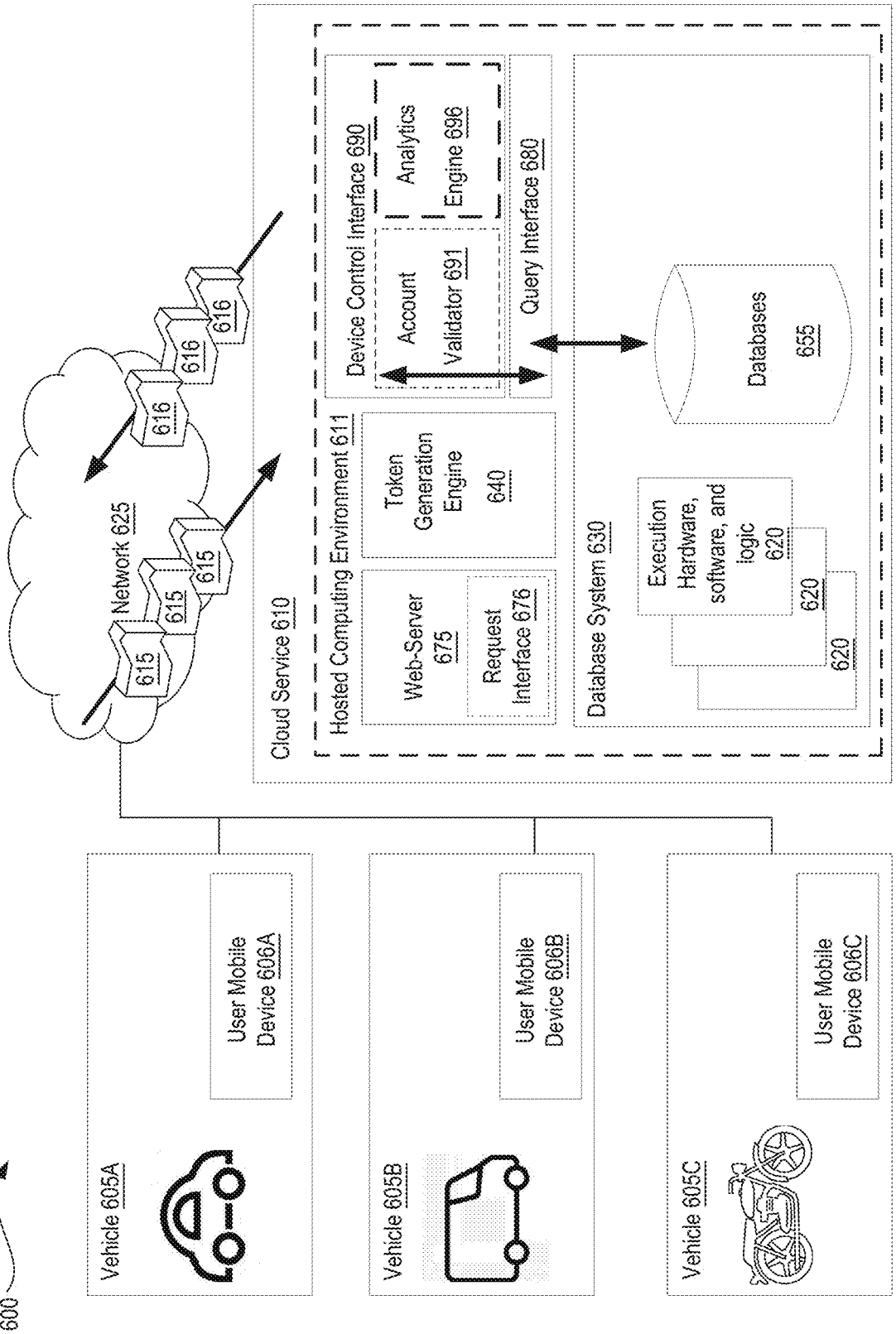
FIG. 6 depicts an exemplary architecture, in accordance with described embodiments.

FIG. 6 depicts an exemplary architecture in accordance with described embodiments.

In one embodiment, a hosted computing environment architecture 611 is communicably interfaced with a plurality of vehicles 605A-C (e.g., such as cars, vans, motorcycles, watercraft, mopeds, scooters, bicycles, etc.) through cloud service 610. Cloud service 610 is communicably interfaced with vehicles 605A-C via Network 625, for instance, over the public Internet. Vehicles 605A-C are associated with each of the mobile devices 106A-C which may include, for example, smart phones and tablets.

In one embodiment, the database system 630 includes databases 655, for example, to store tables, datasets, and underlying database records with user data, settings, pre-selected content, geolocation, etc., on behalf of vehicles 605A-C utilizing architecture 600.

Database system 630 includes a plurality of underlying hardware, software, and logic elements 620 that implement database functionality and a code execution environment within cloud service 610. In accordance with one embodiment, database system 630 further implements databases 655 to service database queries and other data interactions with the databases 655 in support of the cloud service as described herein. The hardware, software, and logic elements 620 of the database system 630 are separate and distinct from a plurality of vehicles (605A, 605B, and 605C) which utilize the services provided by the cloud service 610 by communicably interfacing to the cloud service 610 via network 625. In such a way, cloud service 610 may implement on-demand database services in support of the cloud service 610, or cloud computing services implementing the cloud service 610 on behalf of vehicles 605A-C.

According to particular embodiments, the cloud service 610 integrates and communicates with emergency services and reports for example, analytical data to other platforms and external servers.

As shown here, the cloud service 610 receives input and other requests 615 from a plurality of mobile devices 606A-C on behalf of vehicles 605A-C via network 625 (such as the public Internet). For example, incoming vehicle interactions and events (such as user mobile device 606A-C sensing and docking information, authentication requests, vehicle ECU status information indicating vehicle ignition and relay states, accelerometer data, automated requests for contacting emergency services, etc.), API requests for support GUI interfaces executing at the variously depicted mobile devices 606A-C and more particularly, interactions with displayed graphical user interfaces and displays transmitted to each of the vehicles 605A-C. Other inputs may be received from the vehicles 605A-C to be processed against the database system 630 via the cloud service platform's architecture and its various sub-systems. In certain embodiments, the inputs and requests 615 from vehicles 605A-C may include setting selections, acceptance of default settings or request for non-default options, pre-selected content settings and parameters, all of which is to be hosted, stored, and executed within the cloud service 610 on behalf of such vehicles 605A-C. In such embodiments, responses 616 from the cloud service 610 may constitute menus, alerts, reports, analytics, charts, GUI displays to be presented at mobile devices 606A-C, confirmation of pre-selected content and settings by cloud service 610, or other information in support of cloud service 610 as described herein, or may be some combination thereof.

In one embodiment, each vehicle 605A-C registers with the cloud computing services provided by cloud service 610, for example, via an app or website accessed on user mobile device 606A-C that authenticates vehicle 605A-C.

In one embodiment, requests 615 are received at, or submitted to, a web-server 675 within cloud service 610. The cloud service 610 may receive a variety of requests for processing by cloud service 610 and its administration of the vehicle safety lock assembly system as described herein in conjunction with use of database system 630. Incoming requests 615 received at web-server 675 may specify which pre-selected content, and other configurable settings (e.g., such as displays, users, etc.) are to be applicable for any particular vehicle 605A-605C which are then implemented by cloud service as a series of query requests, search requests, status requests, database transactions, graphical user interface requests and interactions, processing requests to retrieve, update, or store data on behalf of one of the vehicles 605A-C, code execution requests, and so forth, in support of cloud service 610 as described herein.

Web-server 675 may be responsible for receiving requests 615 from various vehicles 605A-C via network 625 and provide a web-based interface or other graphical displays to a mobile device 606A-C or machine originating such data requests 615.

The cloud service 610 may implement a request interface 676 via web-server 675 or as a stand-alone interface to receive requests packets or other requests 615 from the mobile devices 606A-C. Request interface 676 further supports the return of response packets or other replies and responses 616 in an outgoing direction from cloud service 610 to the mobile devices 606A-C. Response packets and responses 616 sent from the cloud service 610 to the variously connected mobile devices 606A-C may constitute a variety of responses 616, such as acknowledgments of receipt (e.g., where no action is taken but confirmation of a request is nevertheless provided) or other interactive responses such as the return of data responsive to a query, generation and presentment of GUI interfaces or other UX/UI and graphical overlays generated by the cloud service 610 and pushed to the mobile devices for display, selection, authentication, restriction of mobile device 606A-C features, etc. The displays at mobile devices 606A-C may be customized to show select content depending on the mobile device. For example, a user of vehicle 605A may choose to enable certain optional features of mobile device 606A while a user of vehicle 605B may choose to disable all features of mobile device 606B.

In certain embodiments, a client-server architecture may be utilized in which the cloud service operates upon servers controlled by a particular organization, such as a private company or governmental entity. In such an implementation, it may be desirable that communications between mobile devices 606A-C and the cloud service are transported via a WAN, LAN, WLAN, VPN, or other more restrictive communications network when compared with transport via the public Internet. Regardless of the networking architecture, interactions between the hosted computing environment architecture 111 and the communicatively interfaced mobile devices 606A-C would remain fundamentally the same.

Further depicted here is an account validator 691 which operates on behalf of cloud service 610 to verify, authenticate, and otherwise credential vehicles 605A-C (e.g., via their respective mobile devices 606A-C) attempting to gain access to the cloud service 610 and its services. According to certain embodiments, account validator 691 may interface with query interface 680 to query databases 655 for account and registration information for mobile devices 606A-C and associated vehicles 605A-605C.

According to certain embodiments, account validator 691 may employ token generation engine 640 to send a form of authentication to mobile device 606A-C of a vehicle 605A-605C such as a token, passcode, two-factor authentication, or other form of authentication in response to a request 615 for authentication generated on behalf of a vehicle 605A-605C. The authentication may be authenticated by a vehicle 605A-C, for example at a vehicle's electronic control unit. Authentication may allow the activation or deactivation of vehicle ignition, for example through the vehicle's electronic control unit, or the restriction or activation of features of mobile device 606A-C when mobile device 606A-C is docked at a corresponding docking unit in a vehicle 605A-C. Account validator 691 may interface with device control interface 690 to apply such restrictions to mobile devices 606A-C and corresponding vehicles 605A-C, for example by transmitting requests for signals to be sent via device control interface 690 to mobile devices 606A-C, associated docking units, and the hardware of vehicles 605A-C including ignition systems and electronic control unit. Such signals may control or restrict functionality and features of mobile devices 606A-C such as texting, media streaming and video calls, when mobile device 606A-C is docked with the docking unit of vehicles 605A-C. Device control interface 690 may also control the operation of vehicles 650A-C as well, for example by sending inhibitory signals to respective ignition systems or electronic control units to prevent vehicles 606A-C from turning on. According to other embodiments, device control interface 690 may signal mobile devices 606A-C or the hardware of vehicles 605A-C to perform other functions such as locking and unlocking doors and windows or even controlling driving of the vehicle remotely.

Analytics engine 696 operates to gather and analyze vehicle 650A-C and mobile device 606A-C data. Analytics engine 696 may gather data for individual associated vehicles and mobile devices or aggregate data across subsections or the entire population of registered mobile devices 606A-C and associated vehicles 605A-C. Analytics engine 696 may perform and report population-wide statistics on, for example, numbers and types of car crashes, positional acceleration information, rate of airbag deployment, vehicle security breaches, demographics of mobile device users, vehicle types, vehicle mileages and performance statistics including fuel and pollution emissions, etc. Such information may be shared or sold to third parties such as governmental entities (department of transportation and road safety), consumer protection and safety groups, electronics and software manufacturers, vehicle manufacturers and retailers, etc. for policy making, marketing, or other decisions.

According to other embodiments, individual data may be gathered by analytics engine 696 and may include, for example, number of docking events, type and frequency of pre-selected features reactivated on mobile device 606A-C after docking (i.e. what kind of available features a particular user of a mobile device prefers to have enabled while operating the vehicle), information about authentication including failed authentication events, number and type of vehicles 605A-C associated with a particular mobile device 606A-C, information on collision events, communications and alerts received on mobile device 606A-C during docking, etc.

Figure 7B:
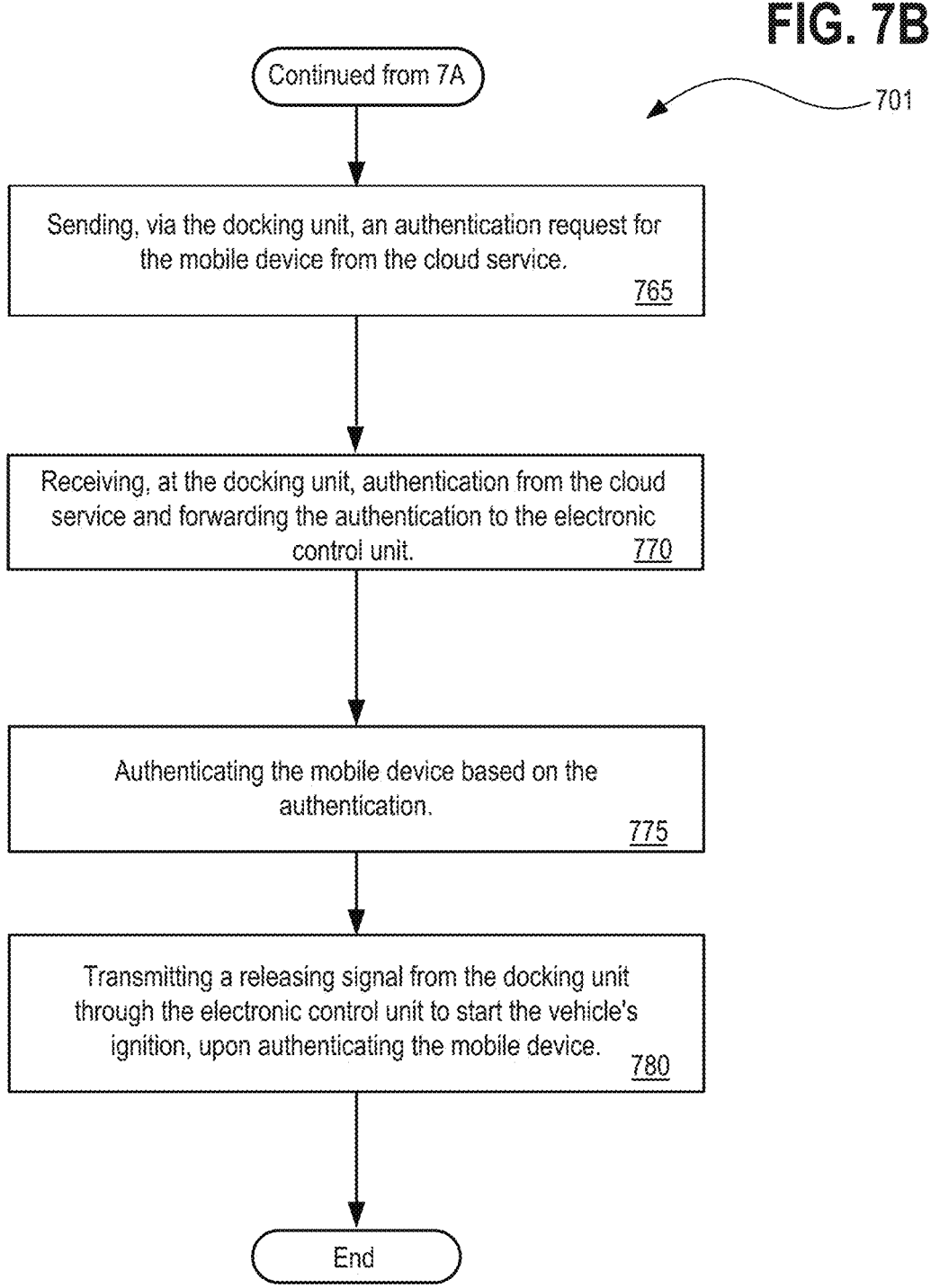

FIGS. 7A and 7B depict a flow diagram illustrating a method 700-701 for implementing a vehicle lock assembly system, in accordance with disclosed embodiments. Method 700-701 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 610 (see FIG. 6), the machine 801 (see FIG. 8), the mobile smart phone and tablet devices (see FIGS. 9A and 9B) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 700-701 depicted at FIGS. 7A and 7B, there is a method performed by a system specially configured to implement and utilize a vehicle safety lock assembly for selectively enabling and disabling a vehicle based on configurable restrictions applied to a mobile device within proximity of the vehicle.

Such a system may be configured with at least a processor and a memory to execute specialized instructions which cause the system to perform the various operations.

As shown in FIG. 7A, at block 730, a method is performed by a vehicle lock assembly system having at least a processor and memory therein to restrict mobile device functionality during vehicle operation, via the following operations:

At block 735, processing logic senses a nearby device not docked at a docking unit, wherein the docking unit is coupled with a vehicle having an electronic control unit, an ignition system, and a first relay, wherein the first relay is to signal from the electronic control unit to the ignition system to start the vehicle's ignition.

At block 740, processing logic inhibits the first relay via a first inhibitory signal requested by the docking unit from a cloud service and forwarding the first inhibitory signal to the electronic control unit.

For example, a mobile device such as a cell phone may be sensed by the docking unit, in which the docking unit is a part of the vehicle safety lock assembly and which may hard-wired to a vehicle's electronic control system (ECU) and ignition system. The ECU and ignition system are connected by a first relay which the docking unit can send a signal to inhibit and thus prevent the vehicle's ignition from turning on. The inhibitory signal may come from a cloud service that manages an app on the mobile device that serves as a means of communication between the mobile device and the vehicle safety lock assembly.

At block 745, the mobile device is docked at the docking unit.

At block 750, processing logic sends a docking signal to a cloud service via transmitter.

At block 755, processing logic receives, via a receiver, a registration confirmation signal indicating that the mobile device is registered with the cloud service.

At block 760, processing logic responsively sends a second inhibitory signal to the mobile device via the docking unit to restrict functionality of pre-selected features on the mobile device when the mobile device is docked.

The method continues at FIG. 7B, block 765, in which processing logic sends, via the docking unit, an authentication request for the mobile device originating from the cloud service.

At block 770, processing logic, receives, via the docking unit, authentication from the cloud service and forwards the authentication to the electronic control unit.

At block 775, processing logic authenticates the mobile device based on the authentication.

At block 780, processing logic transmits a releasing signal from the docking unit through the electronic control unit to start the vehicle's ignition.

For instance, the mobile device may be authenticated with the cloud service by sending a token request, receiving a token from the cloud service, and passing that token onto the ECU where authentication may happen. Once the ECU authenticates the mobile device, it can send a releasing signal to release the inhibition on the ignition system and allow the vehicle ignition to be turned on. This releasing signal could include instructions for removing the inhibition on the first relay or instructions for blocking the second relay from inhibiting the first relay. Following this authentication, the mobile device may receive a second inhibitory single from the cloud service to restrict the device's functionality when it is docked. For example to prevent the user or driver from accessing various mobile applications and services, such as SMS texting, video streaming services, web browsing applications, social media applications, and so forth.

According to another embodiment of method 700-701, the docking unit is manufactured separate from the vehicle and integrated by a third party reseller.

According to another embodiment of method 700-701, the docking unit is manufactured separate from the vehicle and supplied to a vehicle manufacturer by a third party reseller and integrated into the vehicle at the time of manufacture by the vehicle manufacturer.

According to another embodiment of method 700-701, the nearby mobile device is not currently docked at the docking unit, in which the nearby mobile device is in range of the sensor of the docking unit.

According to another embodiment of method 700-701, inhibiting the first relay includes the electronic control unit activating a second relay, in which the second relay overrides the first relay to prevent activation of the vehicle's ignition system.

According to another embodiment of method 700-701, the vehicle safety lock assembly system interfaces with the cloud service via one or more of: (i) the docking unit, (ii) the electronic device, and (iii) a vehicle onboard control system.

According to another embodiment of method 700-701, the authentication is in the form of one or more of the following: (i) a token, (ii) two-factor authentication, (iii) a link, and (iv) a passcode.

According to another embodiment of method 700-701, additional mobile devices are registered with the cloud service and authenticated for use with the vehicle.

According to another embodiment of method 700-701, starting the vehicle's ignition includes using one or more of: (i) a vehicle key, (ii) a vehicle FOB, (iii) a button, (iv) keypad, (v) touchscreen, or (vi) voice command.

According to another embodiment of method 700-701, the pre-selected features on the mobile device include one or more of: (i) texting, (ii) web-browsing, (iii) playback of multimedia content including videos and music, (iv) navigation and map features, (v) video calls, (vi) audio calls and (vii) apps.

According to another embodiment of method 700-701, a user may reactivate a pre-determined selection of the pre-selected features of the mobile device inhibited by the cloud service while the electronic device is positioned within the docking unit, in which the pre-determined selection of the pre-selected features include one or more of: (i) navigation and map features, and (ii) audio calls.

According to another embodiment of method 700-701, the mobile device interfaces with the cloud service via an app.

According to another embodiment of method 700-701, a user interacts with the mobile device when the mobile device is docked to the docking unit via one or more of: (i) a display ("user dashboard") coupled with the docking unit, and (ii) a vehicle media control device.

According to another embodiment of method 700-701, the vehicle ignition is continuously inhibited from starting even when the mobile device is not docked, in which continuously inhibiting the vehicle ignition provides security against vehicle break-in and theft.

According to another embodiment of method 700-701, removing the continuous inhibition is accomplished via: (i) two-factor authentication, (ii) a vehicle onboard control system, (iii) inputting a master code, and (iv) activating a master switch.

According to another embodiment of method 700-701, the docking unit performs additional functions including: (i) charging the mobile device, and (ii) sending data from the mobile device and the electronic control unit to the cloud service for user-specific and population-based analytics.

According to another embodiment of method 700-701, upon determining that the mobile device is not registered with the cloud service, the cloud service sends a request for permission to register the non-registered mobile device to one or more of: (i) the docking unit, and (ii) registered mobile devices associated with the vehicle.

According to another embodiment of method 700-701, the docking unit receives input while the mobile device is docked therein from one or more of: (i) the electronic control unit, (ii) sensors, and (iii) an accelerometer, in which the input reports changes in environmental kinetic parameters, in which reporting at or beyond an acceleration, deceleration, pressure or force threshold triggers the docking unit to transmit an automated outgoing communication to emergency services, in which the automated outgoing communication notifies emergency services of an accident via one or more of: (i) a video call, (ii) phone call, (iii) push notification, (iv) text using one or more of: (a) emergency SMS alert systems, (b) text-to-911 or (c) text relay services, and further in which user information such as geo-location and contact information are also transmitted.

According to a particular embodiment, there is a non-transitory computer readable storage media, having instructions stored thereupon, that, when executed by a vehicle safety lock assembly system having at least a processor and a memory therein, the instructions cause the vehicle safety lock assembly system to perform operations including: sensing, via a sensor of a docking unit, a nearby mobile device not docked at the docking unit, wherein the docking unit is coupled with a vehicle having an electronic control unit, an ignition system, and a first relay, wherein the first relay is to signal from the electronic control unit to the ignition system to start the vehicle's ignition, inhibiting the first relay, via the docking unit requesting a first inhibitory signal from a cloud service and forwarding the first inhibitory signal to the electronic control unit; docking the mobile device at the docking unit, sending, via a transmitter, a docking signal to a cloud service, wherein the docking signal indicates that the mobile device has been docked at the docking unit, receiving, via a receiver, a registration confirmation signal indicating that the mobile device is registered with the cloud service, sending, via the docking unit, a second inhibitory signal to restrict functionality of pre-selected features on the mobile device when the mobile device is docked, responsive to receiving the registration confirmation signal at the receiver; sending an authentication request from the docking unit to the cloud service requesting authentication for the mobile device; receiving authentication from the cloud service at the docking unit and forwarding the authentication to the electronic control unit; authenticating the mobile device based on the authentication; and transmitting a releasing signal from the docking unit through the electronic control device to start the vehicle's ignition, upon authenticating the mobile device.

FIG. 8 illustrates a diagrammatic representation of a machine 801 in the exemplary form of a computer system, in accordance with one embodiment, within which a set of instructions, for causing the machine/computer system 801 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 801 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a token generator 824 (e.g., such as a system component dedicated to receiving requests for a token and either issuing a previously generated token or creating and issuing a token pursuant to successful authentication). Main memory 804 further includes an account validator 823 and a mobile app restrictions controller 825, in support of the methodologies and techniques described herein. Main memory 804 and its sub-elements are further operable in conjunction with processing logic 826 and processor 802 to perform the methodologies discussed herein.

Processor 802 represents one or more specialized and specifically configured processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application-specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 801 may further include a network interface card 808. The computer system 801 also may include a user interface 810 (such as a video display unit, a liquid crystal display, etc.), an alphanumeric input device 812 (e.g., a keyboard), a cursor control device 813 (e.g., a mouse), and a signal generation device 816 (e.g., an integrated speaker). The computer system 801 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 801, the main memory 804 and the processor 802 also constituting machine-readable storage media. The software 822 may further be transmitted or received over a network 820 via the network interface card 808.

Figure 9A:
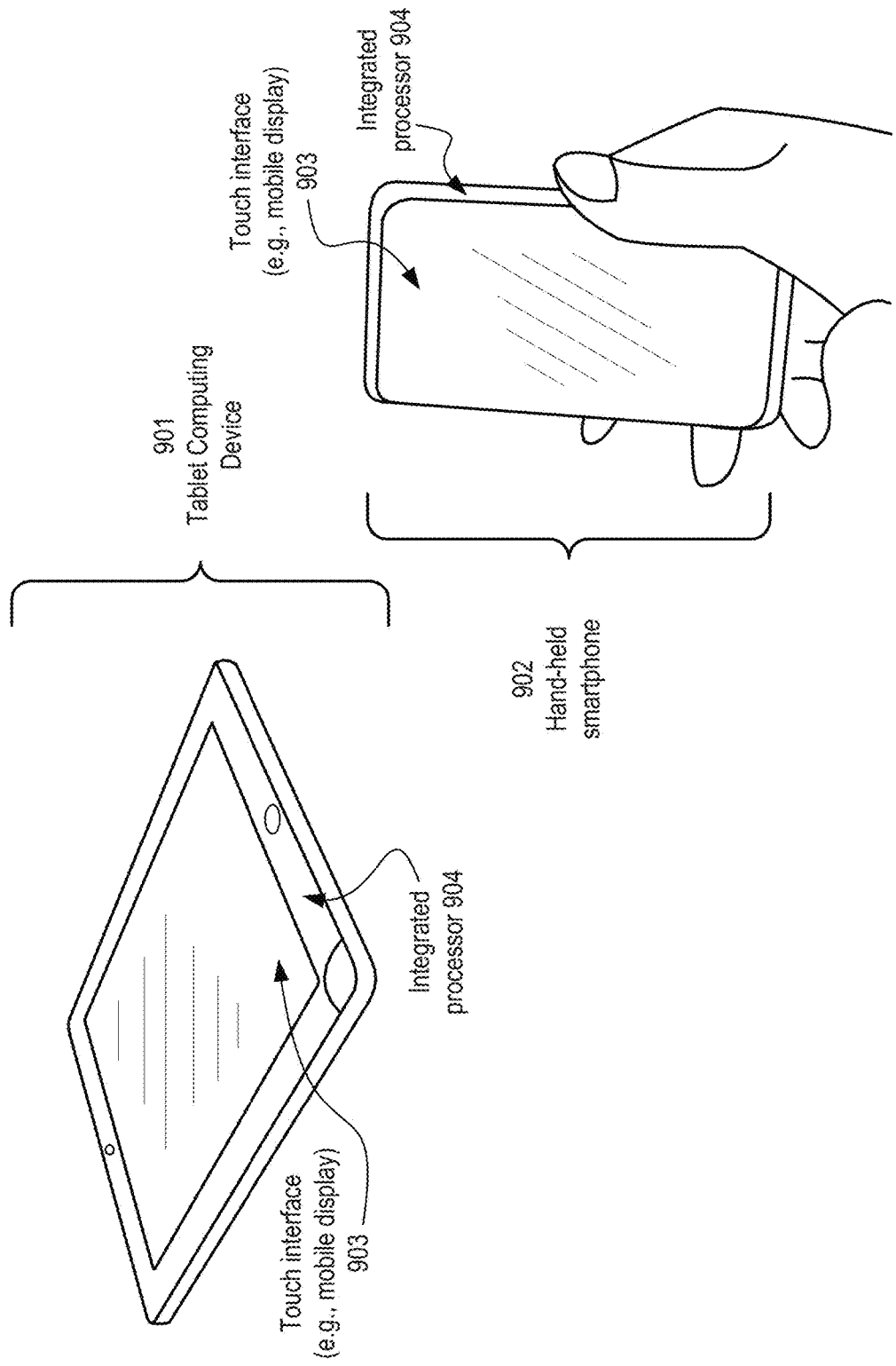
FIG. 9A depicts a tablet computing device and a hand-held smartphone each having a circuitry integrated therein as described in accordance with the embodiments.

FIG. 9A depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 (e.g., a touchscreen or touch sensitive display) and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Figure 9B:
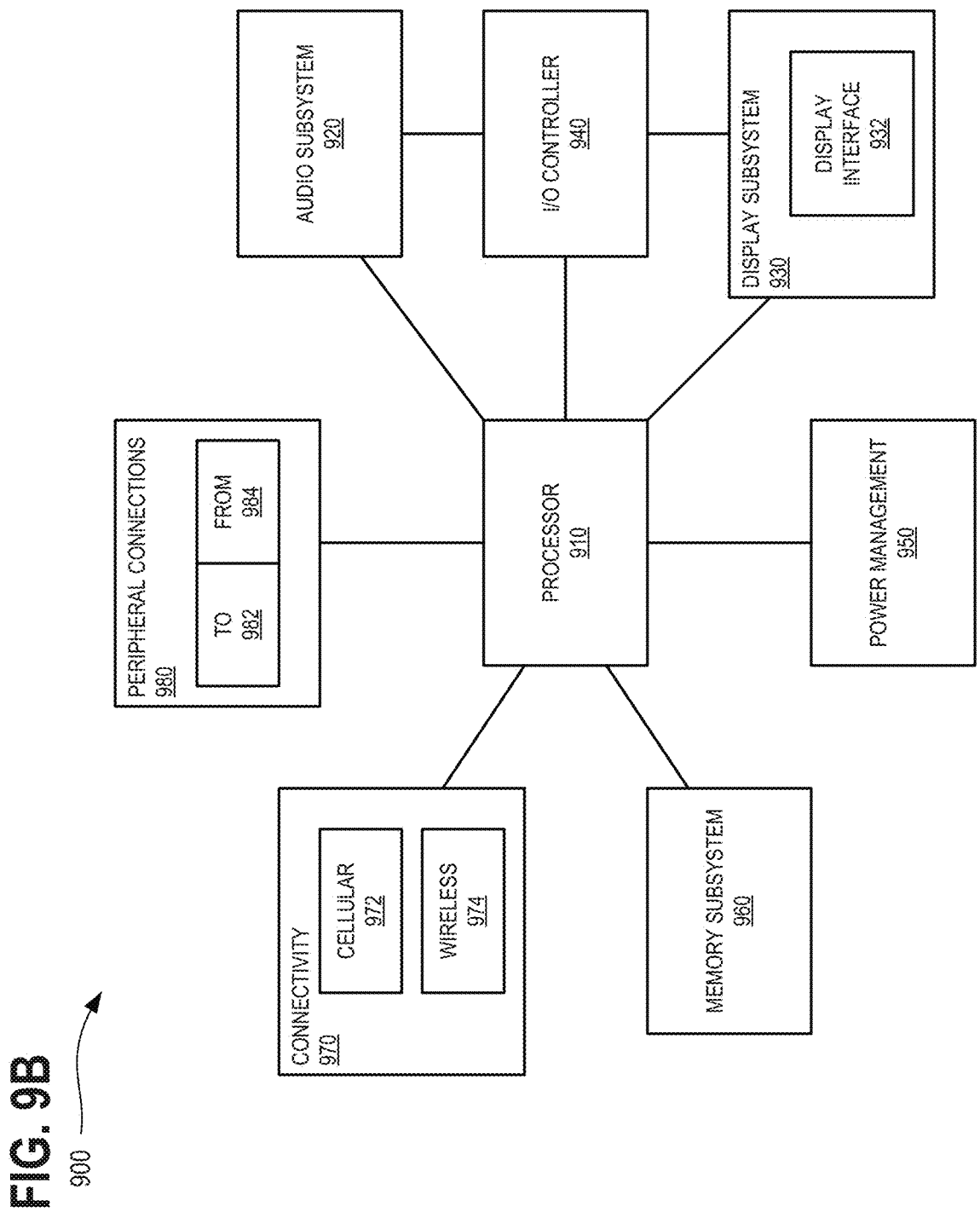
FIG. 9B is a block diagram of an embodiment of tablet computing device, a smart phone, or other mobile device in which touchscreen interface connectors are used.

FIG. 9B is a block diagram 900 of an embodiment of tablet computing device, a smart phone, or other mobile device in which touchscreen interface connectors are used. Processor 910 performs the primary processing operations. Audio subsystem 920 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 910.

Display subsystem 930 represents hardware (e.g., display devices) and software (e.g., drivers) components that provide a visual and/or tactile display for a user to interact with the tablet computing device or smart phone. Display subsystem 930 includes display interface 932, which includes the particular screen or hardware device used to provide a display to a user. In one embodiment, display subsystem 930 includes a touchscreen device that provides both output and input to a user.

I/O controller 940 represents hardware devices and software components related to interaction with a user. I/O controller 940 can operate to manage hardware that is part of audio subsystem 920 and/or display subsystem 930. Additionally, I/O controller 940 illustrates a connection point for additional devices that connect to the tablet computing device or smart phone through which a user might interact. In one embodiment, I/O controller 940 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 950 that manages battery power usage, charging of the battery, and features related to power saving operation. Memory subsystem 960 includes memory devices for storing information in the tablet computing device or smart phone. Connectivity 970 includes hardware devices (e.g., wireless and/or wired connectors and communication hardware) and software components (e.g., drivers, protocol stacks) to the tablet computing device or smart phone to communicate with external devices. Cellular connectivity 972 may include, for example, wireless carriers such as GSM (global system for mobile communications), CDMA (code division multiple access), TDM (time division multiplexing), or other cellular service standards). Wireless connectivity 974 may include, for example, activity that is not cellular, such as personal area networks (e.g., Bluetooth), local area networks (e.g., WiFi), and/or wide area networks (e.g., WiMax), or other wireless communication.

Peripheral connections 980 include hardware interfaces and connectors, as well as software components (e.g., drivers, protocol stacks) to make peripheral connections as a peripheral device ("to" 982) to other computing devices, as well as have peripheral devices ("from" 984) connected to the tablet computing device or smart phone, including, for example, a "docking" connector to connect with other computing devices. Peripheral connections 980 include common or standards-based connectors, such as a Universal Serial Bus (USB) connector, DisplayPort including MiniDisplayPort (MDP), High Definition Multimedia Interface (HDMI), Firewire, etc.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A vehicle safety lock assembly system comprising:
a sensor of a docking unit configured to sense a nearby mobile device, wherein the docking unit is coupled with a vehicle having an electronic control unit, an ignition system, and a first relay, wherein the first relay is configured to signal from the electronic control unit to the ignition system to start the vehicle's ignition;
wherein the docking unit is configured to request and receive a first inhibitory signal from a cloud service and to forward the first inhibitory signal to the electronic control unit to inhibit the first relay and further wherein the docking unit inhibits the first relay from allowing the vehicle to start responsive to the first inhibitory signal once received:
a transmitter configured to send a docking signal to the cloud service indicating that the mobile device has been docked at the docking unit;
a receiver configured to receive a registration confirmation signal indicating that the mobile device is registered with the cloud service;
wherein the docking unit is configured to send a second inhibitory signal, responsive to receiving the registration confirmation signal to restrict functionality of pre-selected features on the mobile device when the mobile device is docked;
wherein the docking unit is further configured to send an authentication request to the cloud service requesting authentication for the mobile device;

wherein the docking unit is configured to receive authentication from the cloud service and to forward the authentication to the electronic control unit, wherein the electronic control unit is to authenticate the mobile device based on the authentication received from the cloud service; and wherein the docking unit is configured to transmit a releasing signal through the electronic control unit upon authentication to start the vehicle's ignition.

2. The vehicle safety lock assembly system of claim 1, wherein the docking unit is configured for integration with the vehicle subsequent to a time of manufacture can configured to be integrated with the vehicle by a third party reseller.

3. The vehicle safety lock assembly system of claim 1, wherein the docking unit is configured for integration with the vehicle during a manufacturing process of the vehicle when provided to the manufacturer by a third party reseller other than the vehicle manufacturer.

4. The vehicle safety lock assembly system of claim 1, wherein the nearby mobile device is not currently docked at the docking unit, wherein the nearby mobile device is in range of the sensor of the docking unit.

5. The vehicle safety lock assembly system of claim 1, wherein inhibiting the first relay includes the electronic control unit activating a second relay, wherein the second relay overrides the first relay to prevent activation of the vehicle's ignition system.

6. The vehicle safety lock assembly system of claim 1, wherein the vehicle safety lock assembly system interfaces with the cloud service via one or more of: (i) the docking unit, (ii) the electronic device, and (iii) a vehicle onboard control system.

7. The vehicle safety lock assembly system of claim 1, wherein the authentication is in the form of one or more of the following: (i) a token, (ii) two-factor authentication, (iii) a link, and (iv) a passcode.

8. The vehicle safety lock assembly system of claim 1, wherein additional mobile devices are registered with the cloud service and authenticated for use with the vehicle.

9. The vehicle safety lock assembly system of claim 1, wherein starting the vehicle's ignition includes using one or more of: (i) a vehicle key, (ii) a vehicle FOB, (iii) a button, (iv) keypad, (v) touchscreen, or (vi) voice command.

10. The vehicle safety lock assembly system of claim 1, wherein the pre-selected features on the mobile device include one or more of: (i) texting, (ii) web-browsing, (iii) playback of multimedia content including videos and music, (iv) navigation and map features, (v) video calls, (vi) audio calls and (vii) apps.

11. The vehicle safety lock assembly system of claim 1, wherein a user may reactivate a pre-determined selection of the pre-selected features of the mobile device inhibited by the cloud service while the electronic device is positioned within the docking unit, wherein the pre-determined selection of the pre-selected features include one of more of: (i) navigation and map features, and (ii) audio calls.

12. The vehicle safety lock assembly system of claim 1, wherein the mobile device interfaces with the cloud service via an app.

13. The vehicle safety lock assembly system of claim 1, wherein a user interacts with the mobile device when the mobile device is docked to the docking unit via one or more of: (i) a display ("user dashboard") coupled with the docking unit, and (ii) a vehicle media control device.

14. The vehicle safety lock assembly system of claim 1, wherein the vehicle ignition is continuously inhibited from starting even when the mobile device is not docked, wherein continuously inhibiting the vehicle ignition provides security against vehicle break-in and theft.

15. The vehicle safety lock assembly system of claim 14, wherein removing the continuous inhibition is accomplished via: (i) two-factor authentication, (ii) a vehicle onboard control system, (iii) inputting a master code, and (iv) activating a master switch.

16. The vehicle safety lock assembly system of claim 1, wherein the docking unit performs additional functions including: (i) charging the mobile device, and (ii) sending data from the mobile device and the electronic control unit to the cloud service for user-specific and population-based analytics.

17. The vehicle safety lock assembly system of claim 1, wherein upon determining that the mobile device is not registered with the cloud service, the cloud service sends a request for permission to register the non-registered mobile device to one or more of: (i) the docking unit, and (ii) registered mobile devices associated with the vehicle.

18. The vehicle safety lock assembly system of claim 1, wherein the docking unit receives input while the mobile device is docked therein from one or more of: (i) the electronic control unit, (ii) sensors, and (iii) an accelerometer, wherein the input reports changes in environmental kinetic parameters, wherein reporting at or beyond an acceleration, deceleration, pressure or force threshold triggers the docking unit to transmit an automated outgoing communication to emergency services, wherein the automated outgoing communication notifies emergency services of an accident via one or more of: (i) a video call, (ii) phone call, (iii) push notification, (iv) text using one or more of: (a) emergency SMS alert systems, (b) text-to-911 or (c) text relay services, and further wherein user information such as geolocation and contact information are also transmitted.

19. A method performed by a vehicle safety lock assembly system to restrict mobile device functionality during vehicle operation, comprising:

sensing, via a sensor of a docking unit, a nearby mobile device not docked at the docking unit, wherein the docking unit is coupled with a vehicle having an electronic control unit, an ignition system, and a first relay, wherein the first relay is to signal from the electronic control unit to the ignition system to start the vehicle's ignition;

inhibiting the first relay, via the docking unit requesting a first inhibitory signal from a cloud service, wherein the docking unit inhibits the first relay from allowing the vehicle to start responsive to the first inhibitory signal once received and wherein the docking unit forwards the first inhibitory signal to the electronic control unit;

docking the mobile device at the docking unit, sending, via a transmitter, a docking signal to a cloud service, wherein the docking signal indicates that the mobile device has been docked at the docking unit, receiving, via a receiver, a registration confirmation signal indicating that the mobile device is registered with the cloud service, sending, via the docking unit, a second inhibitory signal to restrict functionality of pre-selected features on the mobile device when the mobile device is docked, responsive to receiving the registration confirmation signal at the receiver;

sending an authentication request from the docking unit to the cloud service requesting authentication for the mobile device;

receiving authentication from the cloud service at the docking unit and forwarding the authentication to the electronic control unit;

authenticating the mobile device based on the authentication received from the cloud service; and transmitting a releasing signal from the docking unit through the electronic control device to start the vehicle's ignition, upon authenticating the mobile device.

20. Non-transitory computer readable storage media having instructions stored thereupon that, when executed by a vehicle safety lock assembly system having at least a processor and a memory therein, the instructions cause the vehicle safety lock assembly system to perform operations including:

sensing, via a sensor of a docking unit, a nearby mobile device not docked at the docking unit, wherein the docking unit is coupled with a vehicle having an electronic control unit, an ignition system, and a first relay, wherein the first relay is to signal from the electronic control unit to the ignition system to start the vehicle's ignition;

inhibiting the first relay, via the docking unit requesting a first inhibitory signal from a cloud service, wherein the docking unit inhibits the first relay from allowing the vehicle to start responsive to the first inhibitory signal once received and wherein the docking unit forwards the first inhibitory signal to the electronic control unit;

docking the mobile device at the docking unit;

sending, via a transmitter, a docking signal to a cloud service, wherein the docking signal indicates that the mobile device has been docked at the docking unit, receiving, via a receiver, a registration confirmation signal indicating that the mobile device is registered with the cloud service, sending, via the docking unit, a second inhibitory signal to restrict functionality of pre-selected features on the mobile device when the mobile device is docked, responsive to receiving the registration confirmation signal at the receiver;

sending an authentication request from the docking unit to the cloud service requesting authentication for the mobile device;

receiving authentication from the cloud service at the docking unit and forwarding the authentication to the electronic control unit;

authenticating the mobile device based on the authentication received from the cloud service; and transmitting a releasing signal from the docking unit through the electronic control device to start the vehicle's ignition, upon authenticating the mobile device.

\* \* \* \* \*